United States Patent
Atmur

(10) Patent No.: US 10,574,109 B2
(45) Date of Patent: Feb. 25, 2020

(54) PERMANENT MAGNET BIASED VIRTUAL ELLIPTICAL MOTOR

(71) Applicant: The Boeing Company, Chicago, IL (US)

(72) Inventor: Robert J. Atmur, Whittier, CA (US)

(73) Assignee: The Boeing Company, Chicago, IL (US)

( * ) Notice: Subject to any disclaimer, the term of this patent is extended or adjusted under 35 U.S.C. 154(b) by 580 days.

(21) Appl. No.: 15/141,782

(22) Filed: Apr. 28, 2016

(65) Prior Publication Data

US 2017/0317546 A1 Nov. 2, 2017

(51) Int. Cl.
*H02K 3/28* (2006.01)
*H02K 1/17* (2006.01)
*H02P 31/00* (2006.01)

(52) U.S. Cl.
CPC .............. *H02K 3/28* (2013.01); *H02K 1/17* (2013.01); *H02P 31/00* (2013.01)

(58) Field of Classification Search
CPC ........ H02K 41/06; H02K 41/065; H02K 1/17; H02K 3/28; H02K 1/2793; H02K 7/09; H02K 1/182; H02K 21/026; H02K 21/24; H02P 31/00
USPC ....... 310/82, 181, 156.32, 267, 90.5, 154.02
See application file for complete search history.

(56) References Cited

U.S. PATENT DOCUMENTS

| | | | |
|---|---|---|---|
| 37,165 A | 12/1862 | Gary | |
| 1,611,981 A | 12/1926 | Amberg | |
| 2,275,827 A | 3/1942 | Plensler | |
| 2,458,983 A | 1/1949 | Dunn | |
| 2,509,391 A | 5/1950 | Hansen et al. | |
| 2,699,690 A | 1/1955 | Kobler | |
| 2,703,370 A | 3/1955 | Steensen | |
| 2,857,536 A | 10/1958 | Light | |

(Continued)

FOREIGN PATENT DOCUMENTS

| | | | | |
|---|---|---|---|---|
| CH | 233459 A | * | 7/1944 | ............. H02M 1/24 |
| CH | 233459 A | | 7/1944 | |

(Continued)

OTHER PUBLICATIONS

Beschraenkter (CH 233459 A) English Translation. (Year: 1944).*

(Continued)

*Primary Examiner* — Quyen P Leung
*Assistant Examiner* — Robert E Mates
(74) *Attorney, Agent, or Firm* — Kolisch Hartwell, P.C.

(57) ABSTRACT

A wobble plate motor includes a wobble plate and a stator. The wobble plate is made of magnetically susceptible material and has a wobble axis. The stator includes a permanent magnet and a set of electromagnetic coils and has a stator axis. The wobble plate is configured to nutate around the stator with the wobble axis precessing around the stator axis. The wobble plate has a mobile point of closest approach with respect to the stator. The mobile point of closest approach moves around the stator axis as the wobble plate nutates. The permanent magnet and the set of electromagnetic coils are configured to create a magnetic field having a flux density between the stator and the wobble plate with a highest flux density at a mobile location ahead of the mobile point of closest approach in an angular direction around the stator axis as the wobble plate nutates.

20 Claims, 10 Drawing Sheets

(56) References Cited

U.S. PATENT DOCUMENTS

| | | | |
|---|---|---|---|
| 2,866,110 A | 12/1958 | Schön | |
| 2,871,382 A | 1/1959 | Bouvier | |
| 2,908,191 A | 10/1959 | Sundt | |
| 3,117,244 A | 1/1964 | Rosain et al. | |
| 3,234,393 A | 2/1966 | Ruschmann | |
| 3,249,776 A | 5/1966 | Anderson et al. | |
| 3,322,984 A | 5/1967 | Anderson | |
| 3,341,726 A | 9/1967 | Brinster et al. | |
| 3,428,839 A | 2/1969 | Singleton et al. | |
| 3,436,571 A * | 4/1969 | French | H02K 99/00 310/162 |
| 3,463,953 A | 8/1969 | Maxwell | |
| 3,474,272 A | 10/1969 | Newell | |
| 3,525,890 A | 8/1970 | Buchanan, Jr. | |
| 3,539,847 A | 11/1970 | Gifford | |
| 3,579,276 A | 5/1971 | Newell | |
| 3,640,154 A | 2/1972 | Massie | |
| 3,918,315 A | 11/1975 | Rouverol | |
| 4,041,808 A | 8/1977 | Fickelscher | |
| RE29,411 E | 9/1977 | Newell | |
| 4,081,702 A | 3/1978 | Neumann | |
| 4,108,017 A | 8/1978 | Rouverol | |
| 4,330,725 A | 5/1982 | Hintz | |
| 4,495,432 A | 1/1985 | Katsuma et al. | |
| 4,906,881 A | 3/1990 | Knight | |
| 5,111,102 A | 5/1992 | Meeks | |
| 5,747,915 A | 5/1998 | Benavides | |
| 5,804,898 A | 9/1998 | Kawai | |
| 5,820,504 A | 10/1998 | Geralde | |
| 5,906,142 A | 5/1999 | Shirasawa | |
| 5,954,610 A | 9/1999 | Kamimura | |
| 6,131,459 A * | 10/2000 | Seale | A61B 8/4461 310/90.5 |
| 6,568,929 B2 | 5/2003 | Takagi | |
| 6,664,711 B2 | 12/2003 | Baudendistel | |
| 7,165,473 B2 | 1/2007 | Kobayashi et al. | |
| 7,540,865 B2 | 6/2009 | Griffin et al. | |
| 7,824,345 B2 | 11/2010 | Euteneuer et al. | |
| 7,841,994 B2 | 11/2010 | Skujins et al. | |
| 7,850,623 B2 | 12/2010 | Griffin et al. | |
| 7,878,984 B2 | 2/2011 | Jacobsen et al. | |
| 7,914,466 B2 | 3/2011 | Davis et al. | |
| 7,914,467 B2 | 3/2011 | Layman et al. | |
| 7,969,055 B2 | 6/2011 | Titus | |
| 8,022,331 B2 | 9/2011 | Reynolds et al. | |
| 8,048,004 B2 | 11/2011 | Davis et al. | |
| 8,048,060 B2 | 11/2011 | Griffin et al. | |
| 8,105,246 B2 | 1/2012 | Voeller et al. | |
| 8,137,293 B2 | 3/2012 | Zhou et al. | |
| 8,169,118 B2 | 5/2012 | Filatov | |
| 8,182,465 B2 | 5/2012 | Griffin et al. | |
| 8,210,070 B2 | 7/2012 | Takahashi et al. | |
| 8,231,551 B2 | 7/2012 | Griffin et al. | |
| 8,257,279 B2 | 9/2012 | Davis et al. | |
| 8,368,269 B2 | 2/2013 | Titus | |
| 8,376,961 B2 | 2/2013 | Layman et al. | |
| 8,377,035 B2 | 2/2013 | Zhou et al. | |
| 8,409,114 B2 | 4/2013 | Parins | |
| 8,449,526 B2 | 5/2013 | Snyder et al. | |
| 8,535,243 B2 | 9/2013 | Shireman | |
| 8,551,020 B2 | 10/2013 | Chen et al. | |
| 8,551,021 B2 | 10/2013 | Voeller et al. | |
| 8,556,914 B2 | 10/2013 | Vrba | |
| 8,636,716 B2 | 1/2014 | Griffin et al. | |
| 8,646,360 B2 | 2/2014 | Kanai | |
| 9,124,150 B2 | 9/2015 | Atmur | |
| 9,164,497 B2 | 10/2015 | Cameron et al. | |
| 9,281,736 B2 | 3/2016 | Atmur et al. | |
| 9,427,866 B2 | 8/2016 | Hasegawa | |
| 9,768,664 B2 | 9/2017 | Atmur et al. | |
| 2009/0064812 A1 | 3/2009 | Gutmann et al. | |
| 2010/0224435 A1 | 9/2010 | Yamamori | |
| 2013/0134803 A1* | 5/2013 | Goepel | H02K 41/06 310/20 |
| 2013/0319145 A1 | 12/2013 | Shimada | |
| 2014/0285072 A1 | 9/2014 | Atmur et al. | |
| 2015/0015174 A1 | 1/2015 | Atmur | |
| 2015/0024896 A1 | 1/2015 | Takahashi et al. | |
| 2015/0340912 A1* | 11/2015 | Calley | H02K 21/24 310/156.02 |
| 2016/0327015 A1 | 11/2016 | Iida et al. | |
| 2016/0341283 A1 | 11/2016 | Robuck et al. | |
| 2017/0122409 A1 | 5/2017 | Atmur et al. | |
| 2017/0191549 A1 | 7/2017 | Atmur et al. | |
| 2018/0034355 A1 | 2/2018 | Peck, Jr. et al. | |

FOREIGN PATENT DOCUMENTS

| | | | |
|---|---|---|---|
| CN | 2276093 Y | 3/1998 | |
| CN | 203098755 U | 7/2013 | |
| CN | 104065202 A | 9/2014 | |
| DE | 10028964 A1 | 1/2002 | |
| DE | 10237686 A1 | 2/2004 | |
| DE | 102009002587 A1 | 10/2010 | |
| DE | 10237686 B4 | 4/2013 | |
| EP | 0565746 A1 | 10/1993 | |
| EP | 2169263 A1 | 3/2010 | |
| EP | 2169263 B1 | 10/2011 | |
| EP | 2535136 A1 | 12/2012 | |
| EP | 2782230 A2 | 9/2014 | |
| EP | 2838186 A2 | 2/2015 | |
| EP | 2933531 A1 | 10/2015 | |
| EP | 3096444 A1 | 11/2016 | |
| GB | 2211900 A | 7/1989 | |
| GB | 2216982 A | 10/1989 | |
| GB | 2327998 A | 2/1999 | |
| JP | 60017749 A | 1/1985 | |
| JP | 2014187867 A | 10/2014 | |
| JP | 2015039286 A | 2/2015 | |
| WO | 2008149696 A1 | 12/2008 | |
| WO | 2011154981 A1 | 12/2011 | |
| WO | 2014051131 A1 | 4/2014 | |
| WO | WO-2014107474 A1 * | 7/2014 | H02K 21/24 |
| WO | 2014118284 A2 | 8/2014 | |

OTHER PUBLICATIONS

U.S. Patent and Trademark Office, Non-Final Office Action in U.S. Appl. No. 14/932,901, dated Feb. 23, 2018, 48 pages.

European Patent Office, Extended European Search Report in European Patent Application No. 16156922.3-1806, dated Sep. 30, 2016, 6 pages.

European Patent Office, Extended European Search Report in European Patent Application No. 16196546.2-1762, dated May 3, 2017, 9 pages.

European Patent Office, Extended European Search Report in European Patent Application No. 16194812.0-1762, dated Jun. 7, 2017, 8 pages.

Machine Design, Sometimes it Pays to be Eccentric, May 18, 2000, retrieved from the internet on Feb. 18, 2015 from http://machinedesign.com/archive/sometimes-it-pays-be-eccentric, 7 pages.

Machine Design, Flexible gears minimize gearhead backlash for life, Jun. 7, 2001, retrieved from the internet on Feb. 18, 2015 from http://machinedesign.com/archive/flexible-gears-minimize-gearhead-backlash-life, 4 pages.

Machine Design, Flatter reducer makes waves, Jan. 24, 2002, retrieved from the internet on Feb. 18, 2015 from http://machinedesign.com/archive/flatter-reducer-makes-waves, 4 pages.

Susman, Zeke, Harmonic Drive, EVE5320 Mechatronics, Department of Electrical and Computer Engineering, Utah State University, Mar. 11, 2010, retrieved from the Internet on Feb. 18, 2015 from http://mechatronics.ece.usu.edu/ece5320/Schedule/hw01-2010/hw1_Zeke_Susman_a.ppt, 27 pages.

Lipton, Tom, Wabble Drive Proof of Principle, Oct. 19, 2012, retrieved from the internet on Feb. 19, 2015 from http://oxtool.blogspot.com/2012/10/wabble-drive-proof-of-principle.html, 8 pages.

Harmonic Drive Systems, Inc., Strengths of HarmonicDrive®, retrieved from the internet on Feb. 18, 2015 from http://www.hds.co.jp/english/company/business/strength/, 5 pages.

(56) References Cited

OTHER PUBLICATIONS

Antonio S de Castro; Exploring a rehnomic system; Dec. 23, 1999, retrieved from the internet at https://arxiv.org/pdf/physics/9912049.pdf, 6 pages.
Carl A. Nelson et al., Similarity and Equivalence of Nutating Mechanisms to Bevel Epicyclic Gear Trains for Modeling and Analysis, Journal of Mechanical Design, Mar. 2005, vol. 127, 9 pages.
M. Elmoznino et al., An electro-mechanical Pericyclic CVT (P-CVT), 12th IFToMM World Congress, Besancon, France, Jun. 18-21, 2007, 6 pages.
Francesco Fasso et al., An elemental overview of the nonholonomic Noether theorem, Oct. 18, 2009, 11 pages.
Francesco Fasso et al., Conservation of energy and momenta in nonholonomic systems with affine constraints, May 5, 2015, 16 pages.
U.S. Patent and Trademark Office, Non-Final Office Action in U.S. Appl. No. 14/989,760, dated Sep. 21, 2017, 40 pages.
European Patent Office, Extended European Search Report in European Patent Application No. 17167409.6-1809, dated Sep. 22, 2017, 9 pages.
U.S. Patent and Trademark Office, Non-Final Office Action in U.S. Appl. No. 15/494,396, dated Jan. 3, 2019, 43 pages.
U.S. Patent and Trademark Office, Non-Final Office Action in U.S. Appl. No. 15/585,544, dated Jul. 11, 2018, 68 pages.
Canadian Intellectual Property Office, Office Action regarding Canadian Patent Application No. 2,959,019, dated Aug. 20, 2019, 4 pages.
European Patent Office, Examination Report regarding European Patent Application No. 17167409.6, dated Oct. 10, 2019, 6 pages.

\* cited by examiner

PERMANENT MAGNET BIASED VIRTUAL ELLIPTICAL MOTOR

FIELD

This disclosure relates generally to electric motors. More particularly, embodiments of the present disclosure relate to magnetic systems to drive a wobble plate motor.

BACKGROUND

Electric motors create mechanical energy from electromagnetic energy. An alternating current (AC) motor generally includes a rotor and a stationary stator. The stationary stator usually has windings of electrical wires which carry an alternating current which produces a rotating magnetic field. Some rotors include ferromagnetic components which respond to the rotating magnetic field generated by the stator, and as the magnetic field of the stator rotates the rotor physically rotates. By coupling the rotor to an output shaft the electromagnetic energy of the AC current is converted to rotational mechanical energy of the output shaft.

Two or more gears can be used to create a mechanical advantage through a gear ratio. There are many ways to arrange gears so that a single rotation of a first gear results in more or less than one rotation of a second gear in the same amount of time. The gear ratio is the ratio of these two rotations. In the case where the second gear rotates less than the first gear the gear combination could be said to provide a gear reduction. In certain applications it is desirable to have an AC motor with a very high gear ratio, where the gear reduction takes place in the smallest possible volume. For example, an actuator that converts many oscillations of the electrical current into a single rotation of the output shaft could have very fine control.

Historically, wobble plate drive mechanisms have seemed a promising route toward a motor having a high gear ratio within a small volume. Examples of such wobble plate drive mechanisms are disclosed in U.S. Pat. Nos. 9,281,736 and 9,124,150. Older systems are disclosed in U.S. Pat. Nos. 2,275,827 and 3,249,776. The disclosures of these and all other publications referenced herein are incorporated by reference in their entirety for all purposes.

In a wobble plate mechanism, one of the gears, for example a rotor gear, nutates around the other gear, for example a stator gear. As used herein, the terms nutate or nutation includes a wobble, a sway, or a circular rocking motion. If the number of gear teeth on the rotor gear and the stator gear are different by one, then such a system would have a gear ratio equal to the number of teeth on the stator gear. In principle, the gear ratios in wobble plate drive mechanisms could be quite high.

The wobble plate drive mechanism disclosed in U.S. Pat. No. 9,281,736 utilizes a stator including three electromagnetic coils distributed circumferentially around a stator axis. These coils are powered by AC currents that are 120 degrees out of phase with each other and create magnetic fields within the coils which are oriented parallel to the stator axis. A wobble plate motor such as this may require an undesirably high peak voltage applied to the coils.

SUMMARY

A wobble plate motor includes a wobble plate and a stator. The wobble plate is made of magnetically susceptible material and has a wobble axis. The stator includes a permanent magnet and a set of electromagnetic coils and has a stator axis. The wobble plate is configured to nutate around the stator with the wobble axis precessing around the stator axis. The wobble plate has a mobile point of closest approach with respect to the stator. The mobile point of closest approach moves around the stator axis as the wobble plate nutates. The permanent magnet and the set of electromagnetic coils are configured to create a magnetic field having a flux density between the stator and the wobble plate with a highest flux density at a mobile location ahead of the mobile point of closest approach in an angular direction around the stator axis as the wobble plate nutates.

A wobble plate motor includes a wobble plate made of magnetically susceptible material and has a wobble axis. The wobble plate motor includes a stator disposed below the wobble plate which has a stator axis. The stator includes a permanent magnet, a stator core disposed below the permanent magnet, and a set of magnetically susceptible pole pieces distributed circumferentially around the stator core. The stator further includes a first set of electromagnetic coils disposed circumferentially around the stator core between the stator core and the set of pole pieces and a second set of electromagnetic coils disposed circumferentially around the stator core between the stator core and the set of pole pieces. Each of the first set of electromagnetic coils overlaps circumferentially with each of an adjacent pair of electromagnetic coils of the second set of electromagnetic coils. The wobble plate is configured to nutate around the stator with the wobble axis precessing around the stator axis. The wobble plate has a mobile point of closest approach with respect to the stator, where the mobile point of closest approach moves around the stator axis as the wobble plate nutates. The permanent magnet and the first and second sets of electromagnetic coils are configured to create a magnetic field having a flux density between the stator and the wobble plate with a highest flux density at a mobile location ahead of the mobile point of closest approach in an angular direction around the stator axis.

A method of magnetically driving a wobble plate motor includes providing a stator disposed below a wobble plate and having a stator axis. The stator includes a permanent magnet, a stator core disposed below the permanent magnet, and a set of magnetically susceptible pole pieces distributed circumferentially around the stator core. The pole pieces are configured to carry a primary radial magnetic field from the permanent magnet. The stator further includes a first set of electromagnetic coils disposed circumferentially around the stator core between the stator core and the set of pole pieces and a second set of electromagnetic coils disposed circumferentially around the stator core between the stator core and the set of pole pieces. The method includes inducing a first current in each of a pair of adjacent electromagnetic coils of the first set of electromagnetic coils. The first current has a minimum current value at a first time, a maximum current value at a second time, and the minimum current value at a third time. A difference between the third time and the first time is a fraction of a full period of nutation of the wobble plate. The method includes inducing a second current in each of a pair of adjacent electromagnetic coils of the second set of electromagnetic coils. The second current has the minimum current value at the second time, the maximum current value at the third time, and the minimum current value at a fourth time. A difference between the fourth time and the second time is a fraction of a full period of nutation of the wobble plate. One of the pair of adjacent electromagnetic coils of the first set of electromagnetic coils overlaps circumferentially with one of the pair of adjacent electromagnetic coils of the second set of electromagnetic coils.

The other of the pair of adjacent electromagnetic coils of the first set of electromagnetic coils overlaps circumferentially with both of the pair of adjacent electromagnetic coils of the second set of electromagnetic coils.

Features, functions, and advantages may be achieved independently in various embodiments of the present disclosure, or may be combined in yet other embodiments, further details of which can be seen with reference to the following description and drawings.

DESCRIPTION

Overview

Various embodiments of a wobble plate motor having a permanent magnet and a set of electromagnetic coils configured to create magnetic fields perpendicular to a stator axis within each respective electromagnetic coil are described below and illustrated in the associated drawings. Unless otherwise specified, the wobble plate motor and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other similar motors. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

EXAMPLES, COMPONENTS, AND ALTERNATIVES

The following sections describe selected aspects of exemplary wobble plate motors as well as related methods. The examples in these sections are intended for illustration and should not be interpreted as limiting the entire scope of the present disclosure. Each section may include one or more distinct inventions, and/or contextual or related information, function, and/or structure.

Example 1

Figure 1:
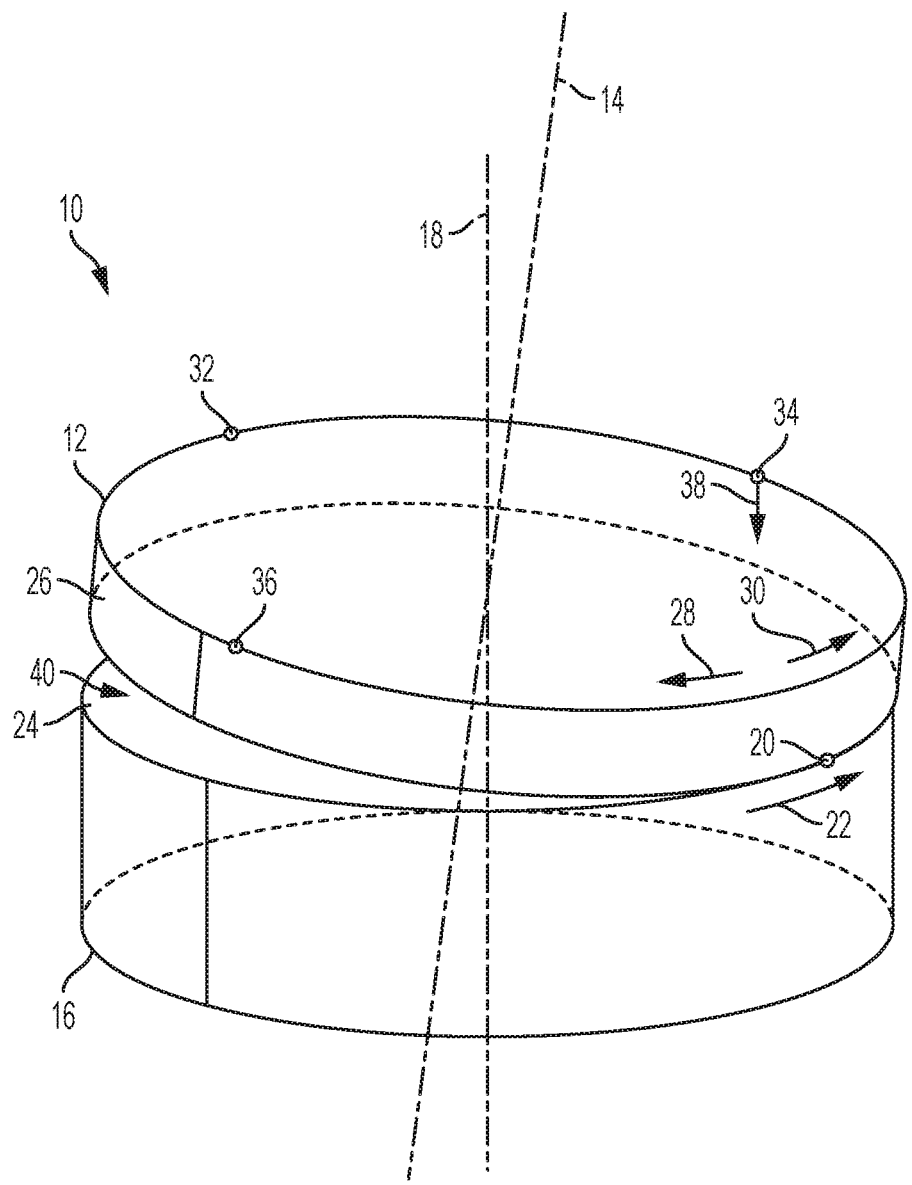
FIG. 1 is a schematic representation of an isometric view of an exemplary wobble plate motor, including a wobble plate and a stator.

This example describes an illustrative wobble plate drive mechanism, see FIG. 1.

FIG. 1 is a schematic representation of a wobble plate motor, generally indicated at 10. Wobble plate motor 10 includes a wobble plate 12 having a wobble axis 14 and a stator 16 having a stator axis 18. The wobble plate is configured to nutate around the stator, with the wobble axis precessing around the stator axis. That is, the wobble plate 12 has a mobile point of closest approach 20 with respect to the stator 16. The mobile point of closest approach moves around the stator axis as the wobble plate nutates. The direction in which the point of closest approach 20 moves around the stator axis 16 may be referred to as the direction of nutation. For example, the mobile point of closest approach 20 may move in a direction of nutation, indicated by arrow 22, around the stator axis 16. The mobile point of closest approach 20 may also be referred to as the down position or the 0-degree position.

The wobble plate 12 may include a set of wobble teeth and the stator 16 may include a set of stator teeth. Many possibilities exist for the shape, configuration, orientation, and disposition of the wobble teeth relative to the wobble plate and the stator teeth relative to the stator. For example, the stator teeth may be disposed on an upper surface 24 of the stator, with the wobble teeth disposed on a corresponding lower surface of the wobble plate. In another example, the wobble teeth may be disposed on an outer cylindrical surface 26, with the stator teeth disposed on a corresponding inner cylindrical surface of the stator. For purposes of generality the wobble teeth and stator teeth are omitted from FIG. 1.

As the wobble plate 12 nutates the wobble teeth may be configured to interact with the stator teeth. This interaction may be similar to the meshing of gear teeth in a standard gear system. For example, during a first nutation of the wobble plate, a first wobble tooth may contact a first stator tooth, a second wobble tooth may contact a second stator tooth, etc. Depending on a relative count of the numbers of wobble teeth and stator teeth, the interaction of the wobble teeth with the stator teeth as the wobble plate nutates may result in a rotation of the wobble plate.

In one example, a count of the number of stator teeth may be one more than a count of the number of wobble teeth. In this example, during a first nutation of the wobble plate 12, a first wobble tooth may interact with a first stator tooth and a second wobble tooth may interact with a second stator tooth, etc. However, at the end of the first nutation, the last wobble tooth may interact with the second-to-last stator tooth and the first wobble tooth may interact with the last stator tooth. That is, during the first nutation, the wobble plate may have rotated in a rotation direction 28 opposite to the nutation direction 22 by an amount equal to an angular spacing between adjacent stator teeth.

In another example, a count of the number of stator teeth may be one less than a count of the number of wobble teeth. In this example, at the end of the first nutation and the beginning of the second nutation, the second-to-last wobble tooth may interact with the last stator tooth and the last wobble tooth may interact with the first stator tooth. That is, during the first nutation, the wobble plate 12 may have rotated in a rotation direction 30 that is the same direction as the nutation direction 22 by an amount equal to the angular spacing between adjacent stator teeth.

As wobble plate 12 nutates around stator 16 in a nutation direction, the wobble plate may rotate in a rotation direction that is the same or opposite the nutation direction. The wobble plate may nutate a number of times equal to the count of stator teeth before completing a full rotation. That is, with only one moving part, namely the wobble plate, wobble plate motor 10 may have a gear ratio in the dozens or hundreds. The wobble plate 12 may be coupled to an output plate or shaft, not pictured in FIG. 1, in order to transfer the rotation of the wobble plate to another object, as is understood by those skilled in the art.

Nutation of the wobble plate 12 around the stator 16 may be driven by forces applied to the wobble plate. For example, electromagnetic forces may be applied to the wobble plate which may cause the wobble plate to nutate. These forces may originate from the stator. These forces may be applied to the wobble plate at any suitable location. For example, the forces may be applied to the wobble plate at a location that is ahead of the mobile point of closest approach 20 in the direction of nutation 22.

Wobble plate 12 may have a mobile point of maximum separation 32 relative to the stator 16. The mobile point of maximum separation may be on an opposite side of the wobble plate as the mobile point of closest approach 20. The mobile point of maximum separation 32 may also be referred to as the 180-degree position. A mobile 90-degree position 34 may be half-way between the 0-degree position 20 and the 180-degree position 32 in the direction of nutation 22. Similarly, a mobile 270-degree position 36 may be half-way between the 180-degree position 32 and the 0-degree position 20 in the direction of nutation 22.

A force, indicated by arrow 38, may be applied to the wobble plate 12 at the 90-degree position 34. Force 38 may point in any appropriate direction. For example, force 38 may be an attractive force and point toward the stator 16 or along a direction parallel to the stator axis 18. As the wobble plate nutates and the 0-degree position 20, the 90-degree position 34, and the 180-degree position 32 all move around the wobble plate, force 38 may also move around the wobble plate so that force 38 is always applied to the wobble plate proximate the 90-degree position 34. That is, the applied force 38 may be said to be ahead of the down position 20 in the direction of nutation 22. The applied force ahead of the down position of the wobble plate may cause the nutation of the wobble plate.

Force 38 may be an electromagnetic force. Force 38 may be a result of a response of the material of wobble plate 12 to electromagnetic fields created by stator 16. The stator includes a permanent magnet and a set of electromagnetic coils. The permanent magnet and the set of electromagnetic coils are configured to create a magnetic field having a flux density between the stator and the wobble plate. That is, a magnetic field may be created in a gap 40 between the stator 16 and the wobble plate 12. The wobble plate may be made of a magnetically susceptible material configured to respond to the magnetic field. Magnetically susceptible materials may become magnetized themselves in the presence of a magnetic field. The wobble plate may respond by experiencing a force such as force 38.

Forces applied to the wobble plate may be proportional to the flux density of the magnetic field between the wobble plate and the stator. To affect an applied force at a mobile location ahead of the down position, the permanent magnet and the set of electromagnetic coils may be configured to create a magnetic field with a highest flux density at a mobile location ahead of the mobile point of closest approach in the nutation direction 22. The electromagnetic coils may be configured so that the highest flux density of magnetic field remains ahead of the down position as the wobble plate nutates.

Example 2

Figure 2:
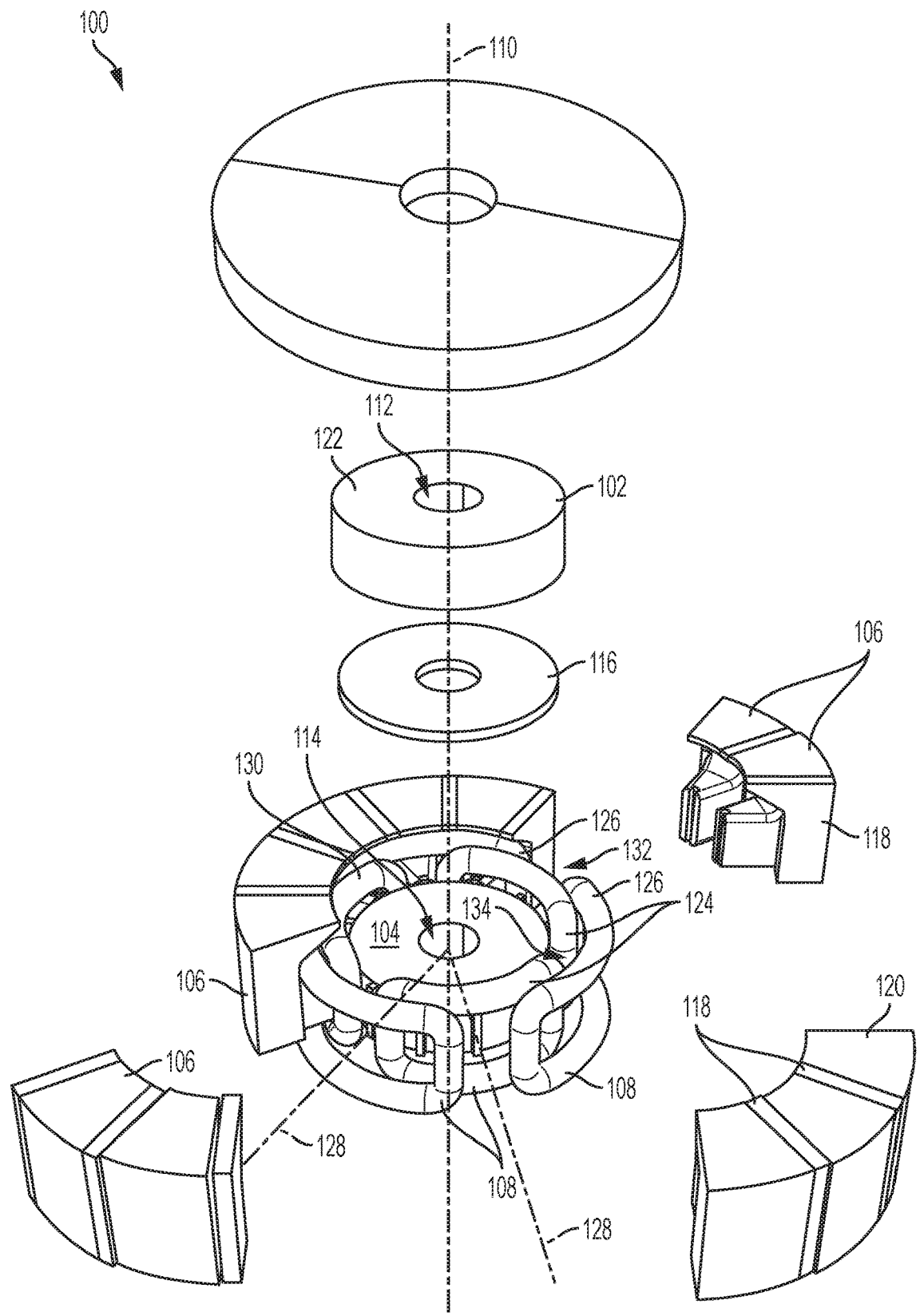
FIG. 2 is a diagrammatic representation of an isometric exploded view of an embodiment of a stator of a wobble plate motor, including a permanent magnet and a set of electromagnetic coils.
Figure 3:
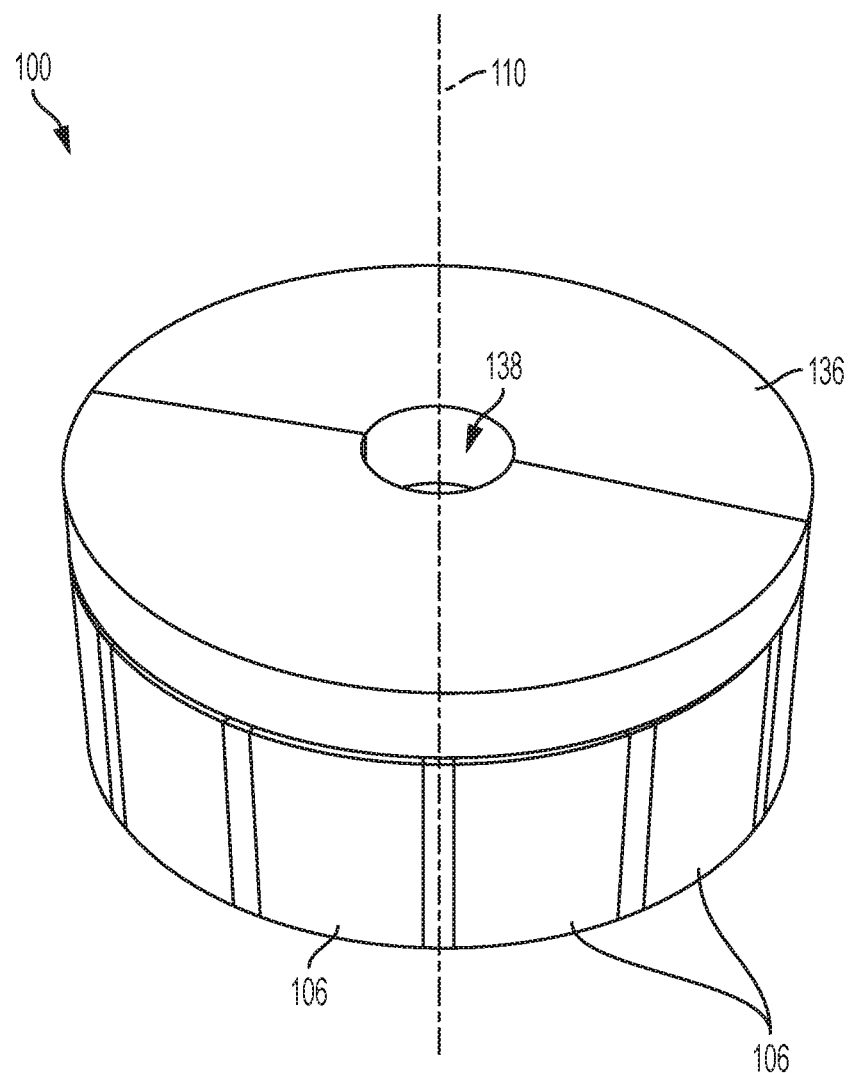
FIG. 3 is a diagrammatic representation of an isometric view of the stator of FIG. 2.

This example describes an illustrative stator of a wobble plate drive mechanism, see FIGS. 2-3.

FIG. 2 is a diagrammatic representation of an isometric exploded view of an embodiment of a stator, generally indicated at 100, of a wobble plate motor. Stator 100 includes a permanent magnet 102, a stator core 104, a set of magnetically susceptible pole pieces 106, and a set of electromagnetic coils 108. Stator 100 has a stator axis 110. Relative dispositions and orientations of components of stator 100 may be described relative to the stator axis. The term "axially" will refer to linear directions which are parallel to the stator axis 110. The term "radially" will refer to linear directions which are perpendicular to the stator axis 110. The term "circumferentially" will refer to angular directions around, but not along or away from, the stator axis.

Permanent magnet 102 may have any appropriate shape and may be configured to generate any appropriate magnetic field. For example, the permanent magnet may be cylindrical, with the stator axis 110 as a symmetry axis, and may include a passage 112 through the permanent magnet along the stator axis. Permanent magnet 102 may be constructed of any appropriate ferromagnetic material. Permanent magnet 102 may have north and south magnetic poles which may be substantially aligned along the stator axis 110. The magnetic field created by the permanent magnet may be referred to as a primary magnetic field.

Stator core 104 may be disposed below the permanent magnet 102. Stator core 104 may be formed of a magnetically susceptible material capable of acquiring a magnetic moment when placed in a magnetic field. For example, stator core 104 may be made of electrical steel or iron. Stator core 104 may have any appropriate shape. For example, the stator core may be cylindrical, with the stator axis 100 as a symmetry axis and a radius matching a radius of the permanent magnet 102. The stator core may include a passage 114 which may be aligned with passage 112 through the permanent magnet.

Stator 100 may include a horizontal spacer 116 disposed between the permanent magnet 102 and the stator core 104. Horizontal spacer 116 may limit the magnetic field transferred from the permanent magnet to the stator core and may help regulate the magnitude of the magnetic field created by stator 100.

The set of magnetically susceptible pole pieces 106 may be distributed circumferentially around the stator core 104. The pole pieces 106 may direct magnetic fields within stator 100 from one component of the stator to another. The pole pieces may be made of any suitable magnetically susceptible material, such as electrical steel. There may be any appropriate number of pole pieces. For example, the embodiment shown in FIG. 2 includes twelve pole pieces. The pole pieces may have any appropriate shape. For example, the twelve pole pieces shown in FIG. 2 are wedge-shaped and may alternately be described as wedge pieces. The pole pieces 106 may be separated by a set of vertical spacers 118. Vertical spacers 118 may help to isolate magnetic fields in the pole pieces between the vertical spacers.

The set of magnetically susceptible pole pieces 106 may collectively have an upper surface area 120. The pole pieces may be sized and configured so that the magnitude of the upper surface area is a predetermined multiple of an upper surface area 122 of the permanent magnet 102. In some embodiments, the upper surface area 120 of the pole pieces may be three times the upper surface area 122 of the permanent magnet.

Figure 9:
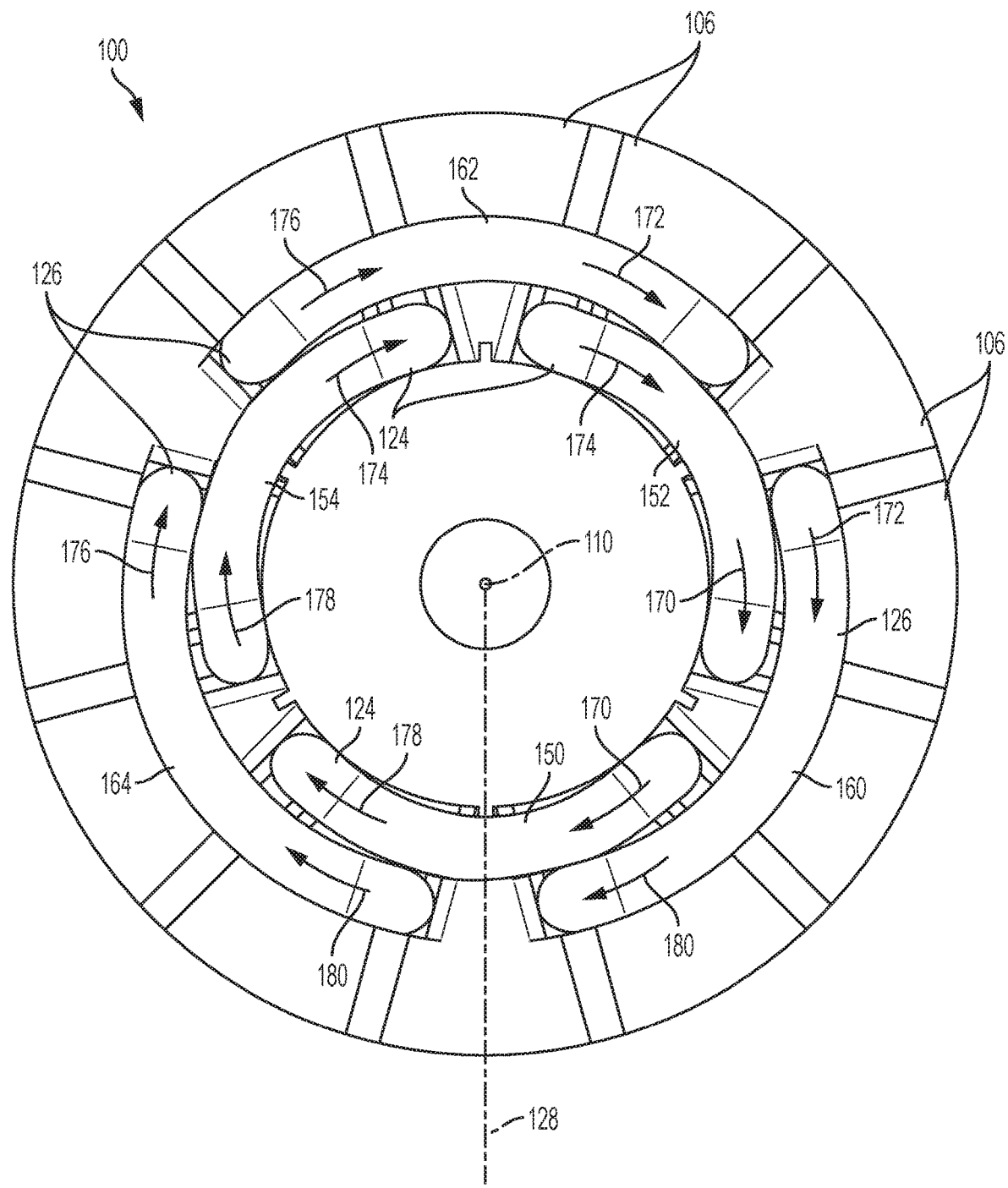
FIG. 9 is a diagrammatic representation of a bottom plan view of the stator of FIG. 2.

The set of electromagnetic coils 108 may be disposed circumferentially around the stator core 104 and between the stator core and the magnetically susceptible pole pieces 106. The set of electromagnetic coils includes a first set of electromagnetic coils and a second set of electromagnetic coils. For example, the first set of electromagnetic coils may include three inner electromagnetic coils 124 and the second set of electromagnetic coils may include three outer electromagnetic coils 126. The three outer electromagnetic coils 126 may be disposed between the inner electromagnetic coils 124 and the set of magnetically susceptible pole pieces 106. The first and second sets of electromagnetic coils may include any appropriate number of coils, including two, three, and more than three coils. The numbers of coils in the first and second sets of electromagnetic coils need not be the same. A bottom plan view of the set of electromagnetic coils 108 is shown in FIG. 9.

Returning to FIG. 2, each of the first set of electromagnetic coils 124 overlaps circumferentially with each of an adjacent pair of electromagnetic coils of the second set of electromagnetic coils 126. Each of the second set of electromagnetic coils 126 may overlap circumferentially with each of an adjacent pair of electromagnetic coils of the first set of electromagnetic coils 124. Each of the set of electromagnetic coils 108 may have a coil axis 128 oriented perpendicularly to the stator axis 110. Each electromagnetic coil may include one or more conductors forming a plurality of closed loops 130 around the coil axis 128. When each of the set of electromagnetic coils carries an electrical current, each coil may create a magnetic field within the coil oriented substantially parallel to the coil axis.

If the inner and outer electromagnetic coils 124 and 126 overlap circumferentially as described above, magnetic field lines created by one of the electromagnetic coils may pass through one or more closed loops defined by another of the electromagnetic coils. For example, portions of the magnetic field created by one of the inner electromagnetic coils 124 may pass through each of an adjacent pair of outer electromagnetic coils 126. If there is an angular gap 132 between the adjacent pair of outer electromagnetic coils, then a portion of the magnetic field created by the inner electromagnetic coil may not pass through either of the adjacent pair of outer electromagnetic coils.

Similarly, portions of the magnetic field created by one of the outer electromagnetic coils 126 may pass through each of an adjacent pair of inner electromagnetic coils 124. If there is an angular gap 134 between the adjacent pair of inner electromagnetic coils, then a portion of the magnetic field created by the outer electromagnetic coil may not pass through either of the adjacent pair of inner electromagnetic coils.

FIG. 3 is an unexploded view of stator 100. Stator 100 may include an upper member 136 disposed over the permanent magnet and the set of magnetically susceptible pole pieces 106. The upper member may cover the upper surface area of the pole pieces and the upper surface area of the permanent magnet. The upper member may include a passage 138 which may be substantially aligned with the passage through the permanent magnet, seen at 112 in FIG. 2. Upper member 136 may be made of any appropriate material, such as magnetically susceptible material such as electrical steel.

The magnetic field created by the stator may enter and exit the upper member in an axial direction. Stator 100 may be used in a wobble plate motor including a wobble plate. In such a system, the wobble plate may be disposed proximate the upper member 136 with a gap between the stator and the wobble plate. Magnetic field lines may exit the stator through the upper member in a substantially axial direction, traverse the gap between the stator and the wobble plate, travel through the wobble plate, again traverse the gap between the wobble plate and the stator, and enter the stator through the upper member in a substantially axial direction.

Example 3

This example describes an illustrative wobble plate drive mechanism or motor, see FIGS. 4-7. In particular, this example describes a primary magnetic field created by a permanent magnet and an induced magnetic field created by a set of electromagnetic coils of the wobble plate motor.

Figure 4:
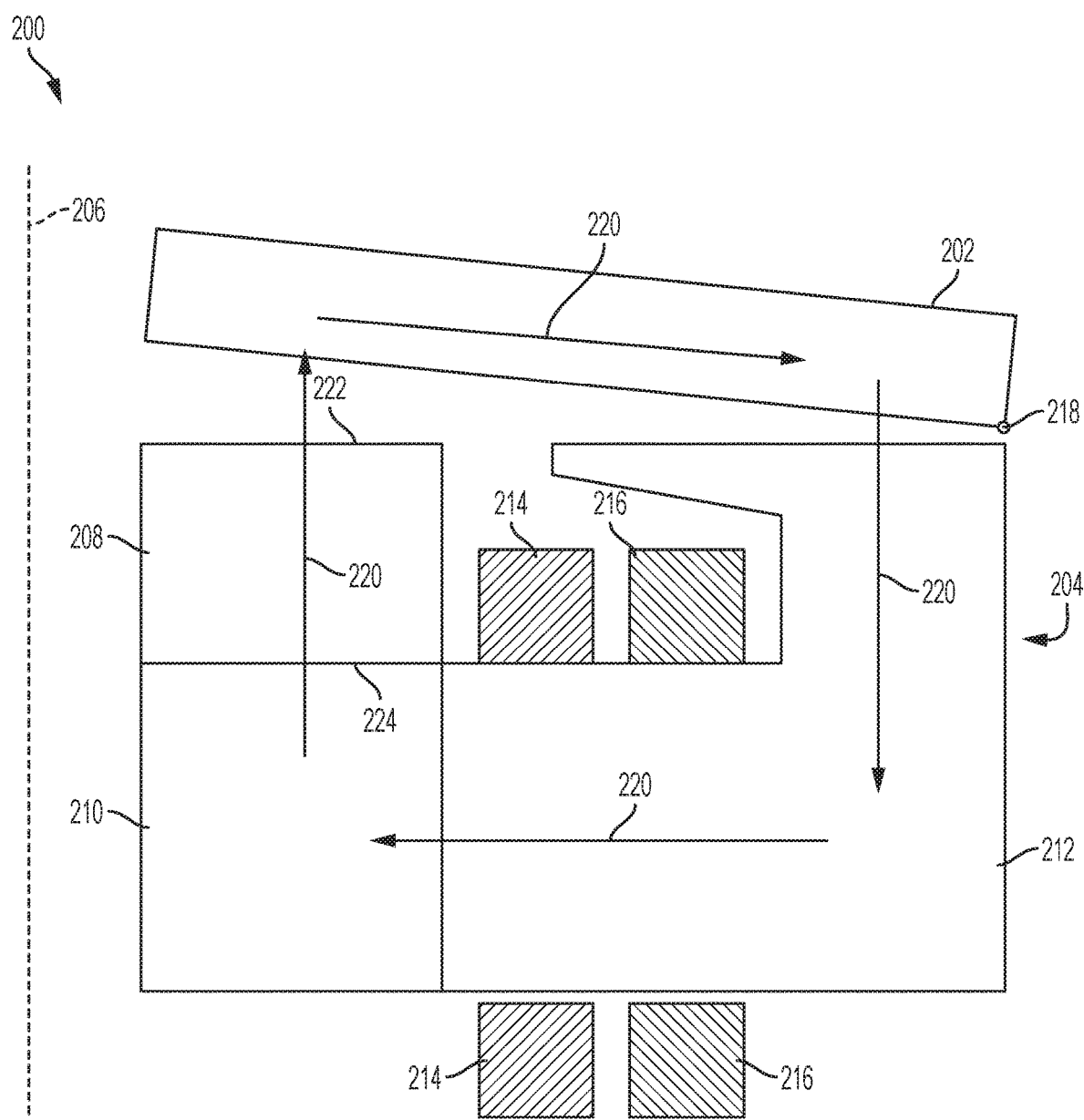
FIG. 4 is a schematic representation of a cross-sectional view of another embodiment of a wobble plate motor, showing magnetic flux produced by a permanent magnet.

FIG. 4 is a schematic cross-sectional view of another embodiment of a wobble plate motor, generally indicated at 200. Wobble plate motor 200 may be similar to wobble plate motor 10 described in Example 1, and the discussion of various features and benefits of motor 10 will not be repeated in its entirety. Wobble plate motor 200 may include a wobble plate 202 and a stator 204 having a stator axis 206. FIG. 4 shows half of a schematic cross-sectional view of wobble plate motor 200, with stator axis 206 at the left edge of the drawing. In a full view of wobble plate motor 200 the stator axis would run through a center of the stator. Stator 204 may be similar to stator 100 described in Example 2, and the discussion of various features and benefits of stator 100 will not be repeated in its entirety.

Stator 204 may include a permanent magnet 208, a stator core 210 disposed below the permanent magnet, and a set of magnetically susceptible pole pieces 212 distributed circumferentially around the stator core. Stator 204 may include a first set of electromagnetic coils 214 disposed circumferentially around the stator core 210 between the stator core and the set of pole pieces 212 and a second set of electromagnetic coils 216 disposed circumferentially around the stator core between the stator core and the set of pole pieces. Each of the first set of electromagnetic coils 214 may overlap circumferentially with each of an adjacent pair of electromagnetic coils of the second set of electromagnetic coils 216. The cross-section depicted in FIG. 4 is taken through the wobble plate motor 200 in a region where one of the first set of electromagnetic coils 214 overlaps circumferentially with one of the second set of electromagnetic coils 216. The cross-section depicted in FIG. 4 further is taken through a mobile point of closest approach 218 of the wobble plate with respect to the stator 204.

Permanent magnet 208 may be configured to create a primary magnetic field, indicated schematically by arrows 220. The primary magnetic field may be created by the permanent magnet and may include the magnetic response to the permanent magnet by the wobble plate 202, the stator core 210, and the set of magnetically susceptible pole pieces 212, any or all of which may become magnetized in the presence of the permanent magnet 208.

Permanent magnet 208 may have a north magnetic pole 222 and a south magnetic pole 224. The north and south magnetic poles may be substantially aligned with the stator axis 206. That is, the primary magnetic field created by the permanent magnet may be directed axially toward the wobble plate 202 and axially toward the stator core 210. The primary magnetic field may be directed axially from the permanent magnet toward and into the wobble plate, may be directed substantially radially within the wobble plate, may be directed axially from the wobble plate toward and into the set of magnetically susceptible pole pieces, may be directed radially from the set of magnetically susceptible pole pieces toward and into the stator core, and may be directed from the stator core toward and into the permanent magnet, thereby forming a closed loop. The primary magnetic field between the stator and the wobble plate may be substantially parallel to the stator axis. As will be understood by a person skilled in the art, wobble plate motor 200 may function equivalently with the permanent magnet 208 having an opposite polarity and the primary magnetic field directed opposite to the arrows 220.

The stator core 210 may be configured to direct the primary magnetic field from the permanent magnet 208 through one or more of the first and second sets of electromagnetic coils 214 and 216 and into the set of magnetically susceptible pole pieces 212. That is, within stator core 210, the primary magnetic field may turn from axial to radial or from radial to axial.

Each of the set of magnetically susceptible pole pieces 212 may be configured to direct a radial magnetic field from the stator core 210 axially toward the wobble plate 202. Each of the set of magnetically susceptible pole pieces 212 may be configured to direct an axial magnetic field from the wobble plate toward the stator core. That is, within each of the set of magnetically susceptible pole pieces the primary magnetic field may turn from axial to radial or from radial to axial.

Figure 5:
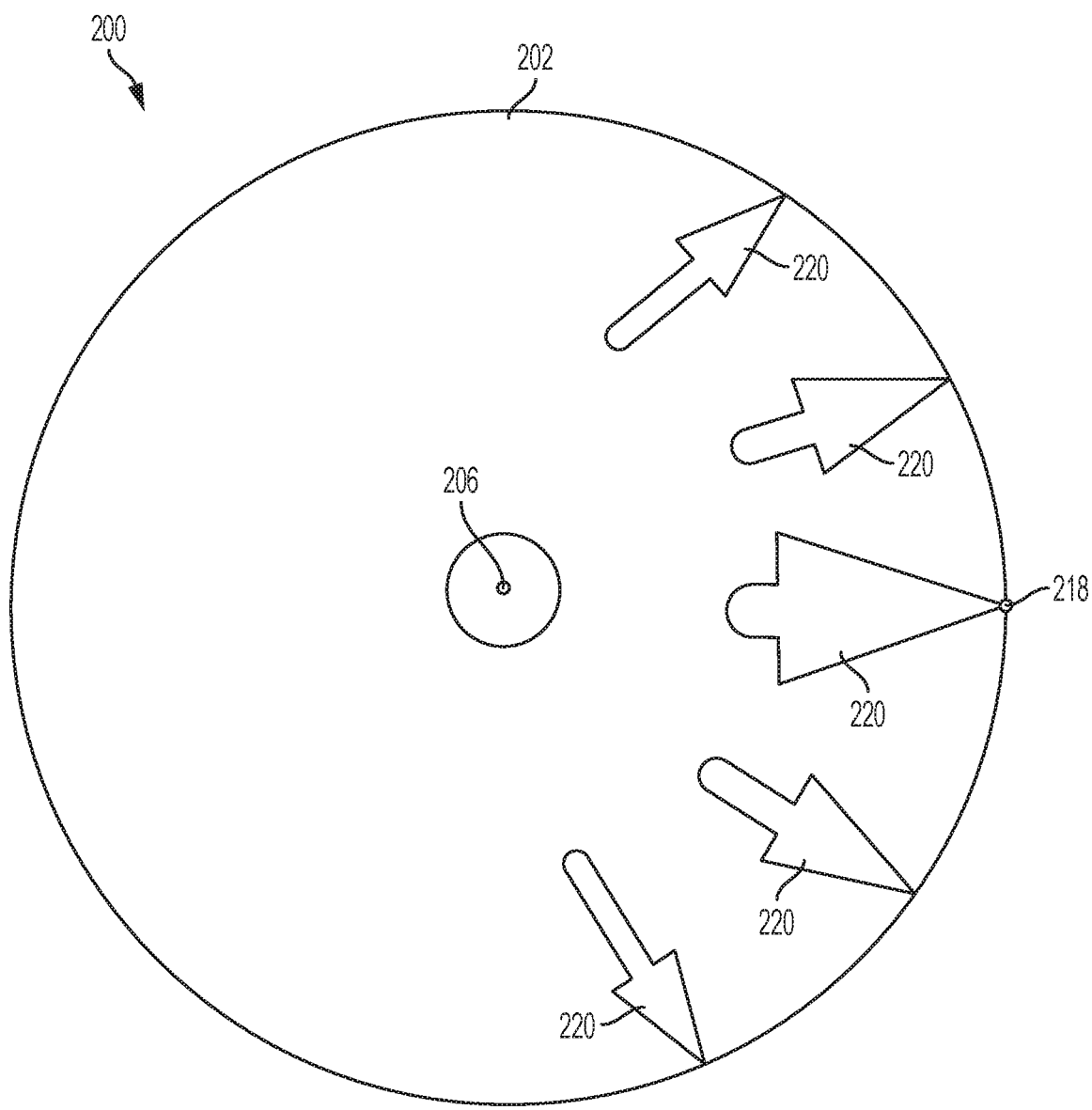
FIG. 5 is a schematic representation of a top view of the wobble plate motor of FIG. 4, showing magnetic flux produced by the permanent magnet.

FIG. 5 is a schematic top view of the wobble plate motor 200, with the primary magnetic field within the wobble plate 202 indicated by arrows 220. Larger arrows may indicate a larger magnitude magnetic field in FIG. 5. The primary magnetic field 220 may have a maximum magnitude within the wobble plate proximate the mobile point of closest approach 218. The magnitude of the primary magnetic field within the wobble plate may decrease with angular distance from the point of closest approach. Near the point of closest approach 218 the primary magnetic field 220 may be directed substantially radially away from the stator axis 206. The direction of the magnetic field within the wobble plate may have radial component and an azimuthal component, with the relative magnitude of the azimuthal component increasing with angular distance from the point of closest approach.

In isolation, the permanent magnet 208 may create a magnetic field that is largely symmetric about the stator axis. This symmetry may be broken in wobble plate motor 200 by the inclination of wobble plate 202 with respect to the stator axis, thereby creating the asymmetric primary magnetic field depicted in FIG. 5.

Figure 6:
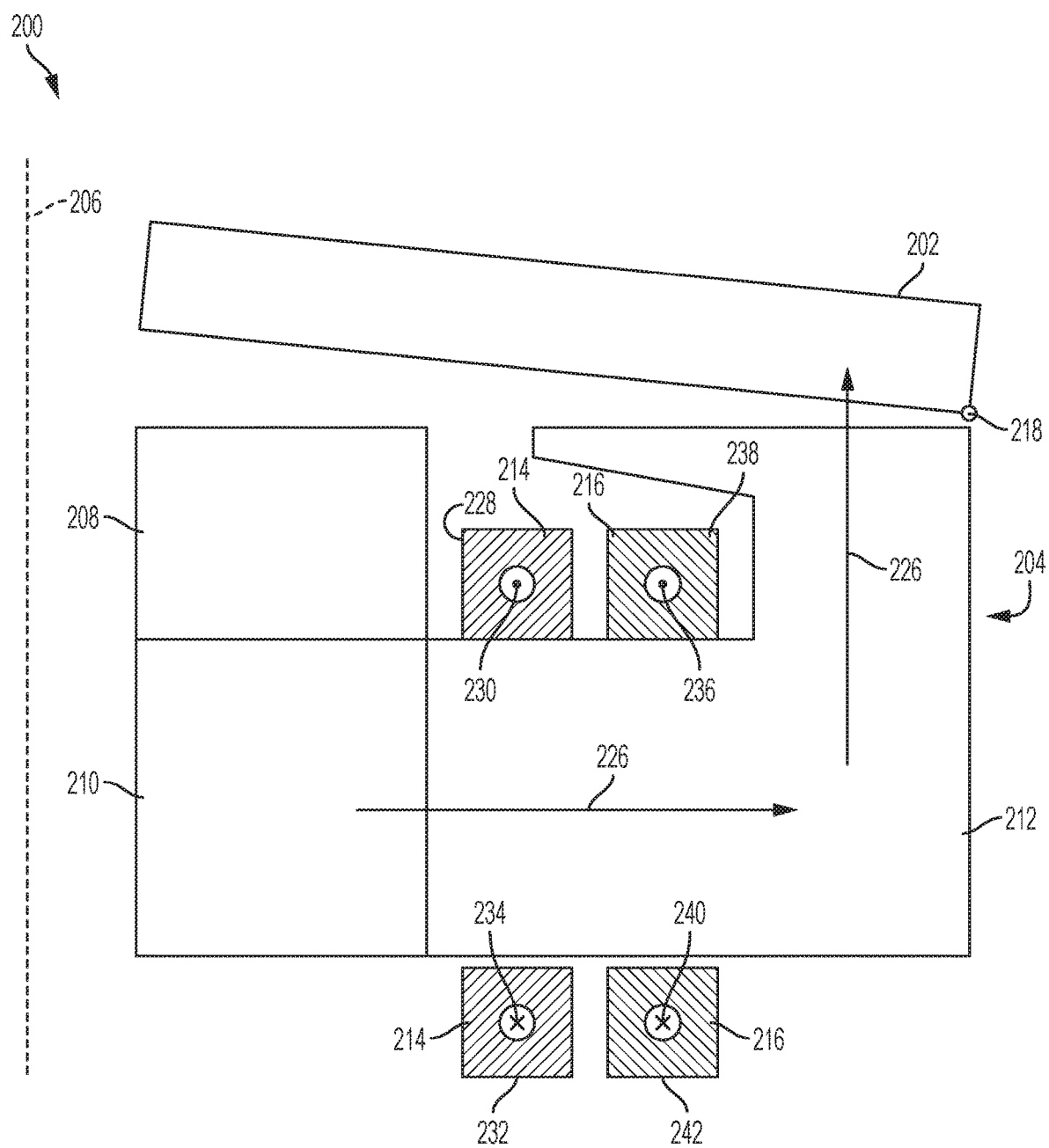
FIG. 6 is a schematic representation of a cross-sectional view of the wobble plate motor of FIG. 4, showing magnetic flux produced by a set of electromagnetic coils.

FIG. 6 is a schematic cross-sectional view of the wobble plate motor 200, similar to FIG. 4. One or more of the first set of electromagnetic coils 214 and one or more of the second set of electromagnetic coils 216 may be configured to produce an induced magnetic field, indicated by arrows 226. The induced magnetic field 226 may be produced when an electrical current flows through one or more of the electromagnetic coils 214 and 216. Each of the first and second sets of electromagnetic coils may be oriented to produce the induced magnetic field 226 within said electromagnetic coil that is directed radially toward or away from the stator axis 206.

For example, to create an induced magnetic field 226 directed radially within electromagnetic coil 214 an electrical current may pass through an upper portion 228 of electromagnetic coil 214 in a direction perpendicular to the plane of FIG. 6 toward the viewer of FIG. 6, as indicated by dot 230. Correspondingly, the electrical current may pass through a lower portion 232 of electromagnetic coil 214 in a direction perpendicular to the plane of FIG. 6 away from the viewer of FIG. 6, as indicated by cross 234. The direction of the current through electromagnetic coil 214 and the direction of the induced magnetic field 226 within electromagnetic coil 214 are consistent with established right-hand-rules in physics.

Similarly, electromagnetic coil 216 may carry a current, indicated as a dot 236 in an upper portion 238 and as a cross 240 in a lower portion 242, to contribute to induced magnetic field 226. The current in the electromagnetic coil 216 need not have the same magnitude or phase as the current in electromagnetic coil 214.

The induced magnetic field 226 may be produced within the set of magnetically susceptible pole pieces 212. Each of the set of magnetically susceptible pole pieces may be configured to direct the induced radial magnetic field from one of the set of electromagnetic coils axially toward the wobble plate 202. That is, the induced magnetic field between the stator 204 and the wobble plate may be substantially parallel to the stator axis 206. Proximate the mobile point of closest approach 218 the induced magnetic field 226 may oppose the primary axial magnetic field, see 220 in FIG. 4, between the stator 204 and the wobble plate. Once the induced magnetic field enters the wobble plate 202 it may be directed radial toward the stator axis and azimuthally around the stator axis.

Figure 7:
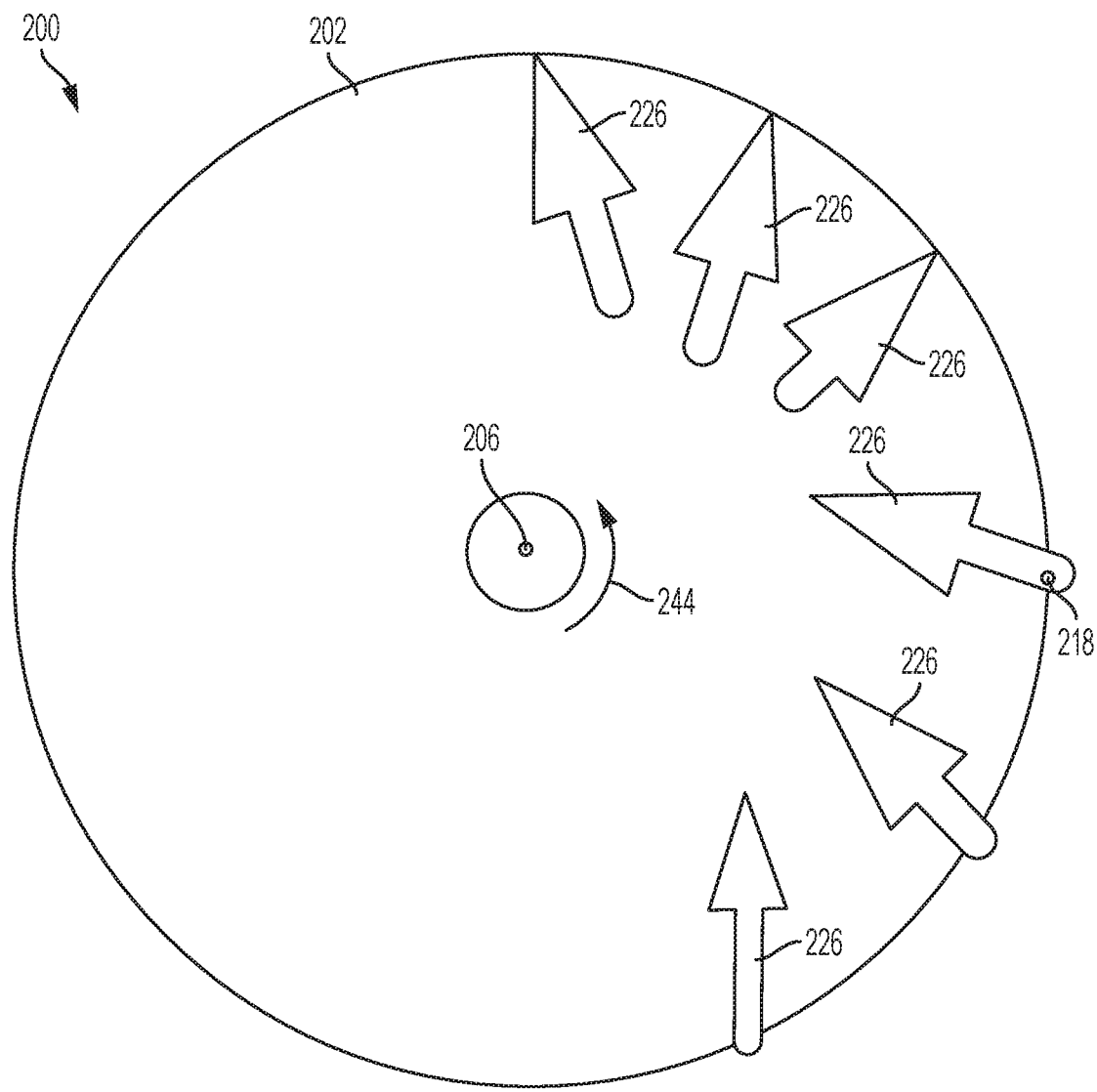
FIG. 7 is a schematic representation of a top view of the wobble plate motor of FIG. 4, showing magnetic flux produced by the set of electromagnetic coils.

FIG. 7 is a schematic top view of the wobble plate motor 200, similar to FIG. 5, with the induced magnetic field within the wobble plate 202 indicated by arrows 226. Larger arrows may indicate a larger magnetic field in FIG. 7. The induced magnetic field 226 may have a maximum magnitude within the wobble plate proximate the mobile point of closest approach 218. The magnitude of the induced magnetic field within the wobble plate may decrease with angular distance from the point of closest approach.

The induced magnetic field 226 within the wobble plate 202 may have radial components and azimuthal components. In the example shown in FIG. 7, the wobble plate may be nutating in a nutation direction indicated by curved arrow 244. That is, as wobble plate 202 nutates the mobile point of closest approach 218 may move in the nutation direction 244. Proximate the mobile point of closest approach, the induced magnetic field within the wobble plate may have a relatively large, inward, radial component and a relatively small azimuthal component along the nutation direction 244. The relative magnitude of the azimuthal component of the induced magnetic field may increase with distance from the point of closest approach.

At azimuthal locations proximate the point of closest approach 218 and ahead of the point of closest approach in the nutation direction 244, the induced magnetic field 226 within the wobble plate 202 may have an outward radial component. At azimuthal locations proximate the point of closest approach and behind of the point of closest approach in the nutation direction, the induced magnetic field within the wobble plate may have an inward radial component.

Referring now to FIGS. 4-7, the permanent magnet 208 and the set of electromagnetic coils 214 and 216 may be configured to create a magnetic field having a flux density between the stator 204 and the wobble plate 202 with a highest flux density at a mobile location ahead of the mobile point of closest approach 218 in the angular direction 244 around the stator axis 206 as the wobble plate nutates. The magnetic field may be a total magnetic field as the vector sum of the primary magnetic field 220 created by the permanent magnet and induced magnetic field 226 created by the set of electromagnetic coils. Of course, each of the primary and induced magnetic fields may also depend upon the magnetic responses of wobble plate 202, the stator core 210, and the set of magnetically susceptible pole pieces 212.

Proximate the point of closest approach 218, the primary magnetic field 220 and the induced magnetic field 226 may largely cancel each other out. At this location there may remain a relatively small azimuthal component of the total magnetic field. This cancellation or near cancellation may also occur at azimuthal locations proximate the point of closest approach which are also behind the point of closest approach in the nutation direction 244. In contrast, at azimuthal locations ahead of the point of closest approach in the nutation direction, the primary magnetic field and the induced magnetic field may largely add together to increase the relative magnitude of the total magnetic field. In particular, the outward radial components of the primary and induced magnetic fields within the wobble plate may add together at locations ahead of the point of closest approach. Thus, there may be a mobile location of highest flux density between the wobble plate and the stator ahead of the point of closest approach.

An attractive force may exist between the wobble plate 202 and the stator 204. The attractive force felt by the wobble plate may vary with position around the wobble plate. A maximum attractive force between the wobble plate and the stator may be applied to the wobble plate at the mobile location of highest flux density.

Example 4

Figure 8:
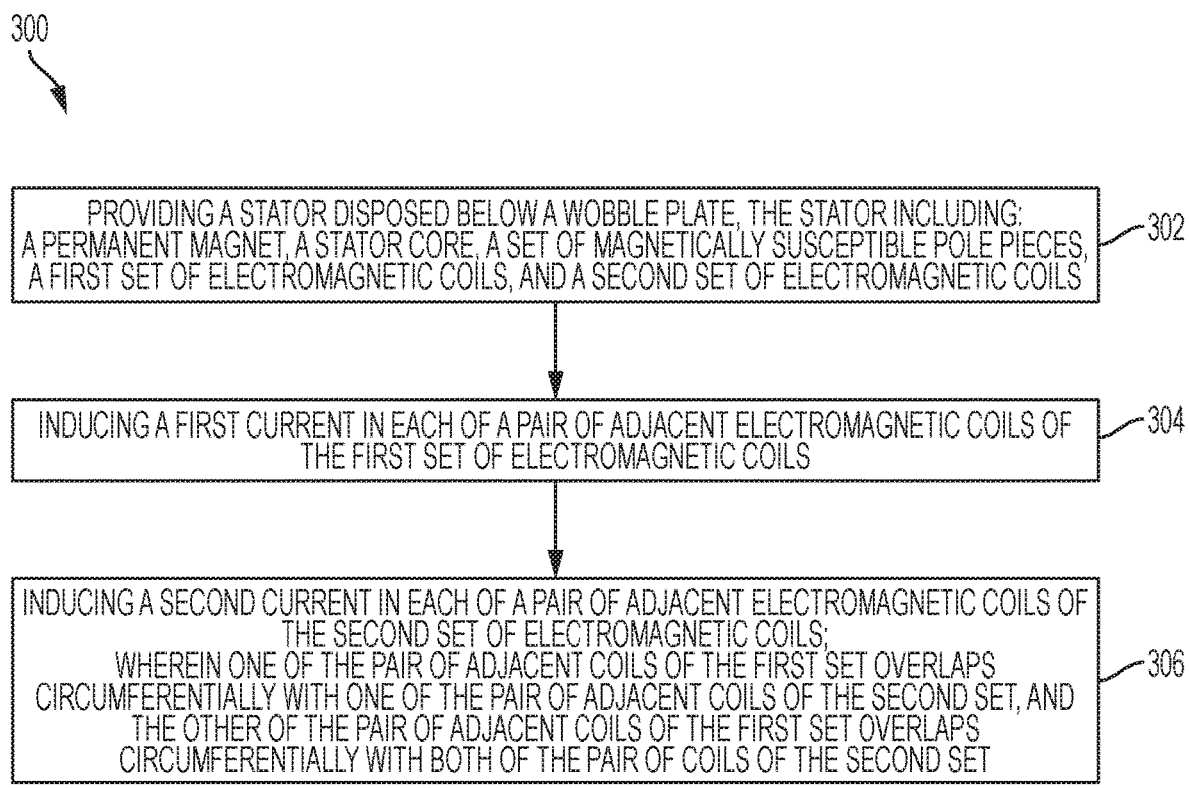
FIG. 8 is a diagrammatic representation of a flow chart illustrating a method of magnetically driving a wobble plate motor.
Figure 10:
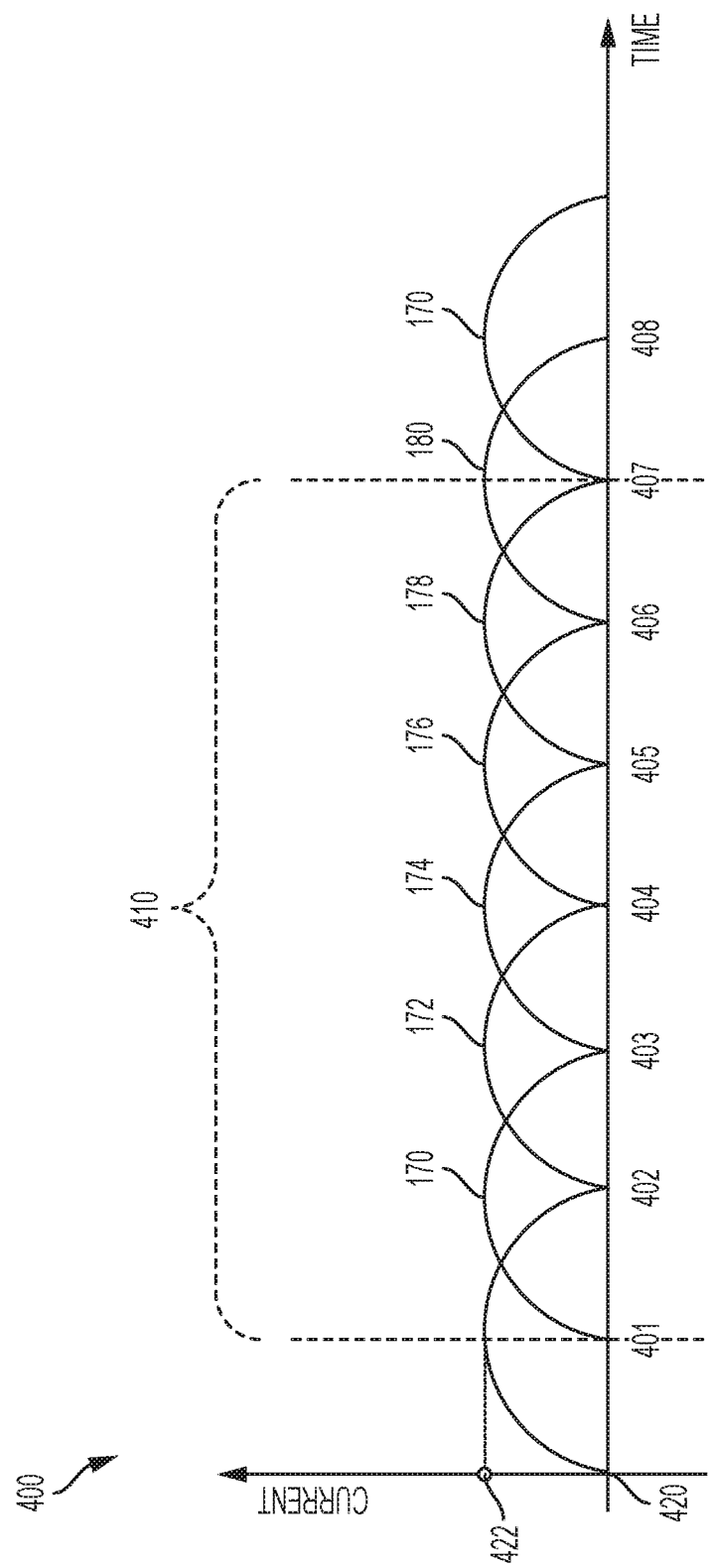
FIG. 10 is a schematic representation of a graph of a set of currents induced in the set of electromagnetic coils of the stator of FIG. 2 versus time.

This example describes an illustrative method of magnetically driving a wobble plate motor, which may be used in conjunction with any of the apparatuses described herein; see FIG. 8-10.

FIG. 8 depicts multiple steps of a method, generally indicated at 300 of magnetically driving a wobble plate motor. Method 300 may be used in conjunction with any of the wobble plate motors depicted in and described in reference to FIGS. 1-7. Although various steps of method 300 are described below and depicted in FIG. 8, the steps need not necessarily all be performed, and in some cases may be performed in a different order than the order shown.

Method 300 includes a step 302 of providing a stator disposed below a wobble plate. The stator may include a permanent magnet, a stator core, a set of magnetically susceptible pole pieces, a first set of electromagnetic coils, and a second set of electromagnetic coils. The stator may have a stator axis and the wobble plate may have a wobble axis. The stator core may be disposed below the permanent magnet.

An example of such a stator is stator 100 described in Example 2. A bottom plan view of stator 100 is shown in FIG. 9. The set of magnetically susceptible pole pieces 106 may be distributed circumferentially around the stator core 104 and may be configured to carry a primary radial magnetic field from the permanent magnet. The first set of electromagnetic coils 124 may be disposed circumferentially around the stator core between the stator core and the set of pole pieces 106. The second set of electromagnetic coils 126 may be disposed circumferentially around the stator core 104 between the stator core and the set of pole pieces.

As described previously, the first set of electromagnetic coils 124 may include three inner electromagnetic coils: a first electromagnetic coil 150, a second electromagnetic coil 152 and a third electromagnetic coil 154. The second set of electromagnetic coils 126 may include three outer electromagnet coils: a fourth electromagnetic coil 160, a fifth electromagnetic coil 162, and a sixth electromagnetic coil 164. Each of the inner and outer electromagnetic coils may span approximately 90-degree around the stator axis 110. Each of the inner and outer electromagnetic coils may be configured to direct magnetic field radially to three of the twelve wedge pieces 106.

The fourth electromagnetic coil 160 may overlap circumferentially with the first electromagnetic coil 150 and the second electromagnetic coil 152. The fifth electromagnetic coil 162 may overlap circumferentially with the second electromagnetic coil 152 and the third electromagnetic coil 154. The sixth electromagnetic coil 164 may overlap circumferentially with the third electromagnetic coil 154 and the first electromagnetic coil 150.

Method 300 includes a step 304 of inducing a first current in each of a pair of adjacent electromagnetic coils of the first set of electromagnetic coils. For example, the first current, indicated by arrows 170 in FIG. 9, may be induced in the first electromagnetic coil 150 and the second electromagnetic coil 152. The first current 170 may not be constant in time but may have a time dependence.

FIG. 10 is a graph, generally indicated at 400, of a set of currents induced in the set of electromagnetic coils of the stator versus time. Eight regularly spaced times are indicated on the time axis: a first time 401, a second time 402, a third time 403, a fourth time 404, a fifth time 405, a sixth time 406, a seventh time 407, and an eighth time 408. A period of nutation 410 of the wobble plate may be equal to the interval of time between the seventh time 407 and the first time 401.

The first current 170 may have a minimum current value 420 at the first time 401, a maximum current value 422 at the second time 402, and the minimum current value 420 at the third time 403. The minimum current value 420 may be zero. The maximum current value 422 may depend on a number of loops in the electromagnetic coil. If the number of loops in the first electromagnetic coil is referred to as N, a product of the maximum current value 422 and the number N may be in a range of 2,500 to 3,000 amps. In other embodiments, the product of the maximum current value 422 and the number N may be in a range of 1,000 to 5,000 amps. A difference between the third time and the first time may be a fraction of a full period of nutation 410 of the wobble plate. For example, the difference between the third time and the first time may be one third of the period of nutation.

Method 300 includes a step 306 of inducing a second current in each of a pair of adjacent electromagnetic coils of the second set of electromagnetic coils. One of the pair of adjacent electromagnetic coils of the first set may overlap circumferentially with one of the pair of adjacent electromagnetic coils of the second set and the other of the pair of adjacent electromagnetic coils of the first set may overlap circumferentially with both of the pair of electromagnetic coils of the second set. For example, the second current, indicated by arrows 172 in FIG. 9, may be induces in the fourth electromagnetic coil 160 and the fifth electromagnetic coil 164. The first electromagnetic coil 150 may overlap circumferentially with the fourth electromagnetic coil 160 and the second electromagnetic coil 152 may overlap with both of the fourth and fifth electromagnetic coils 160 and 162.

The second current 172 may have a similar time dependence as the first current 170, though the second current may be shifted in time with respect to the first current. That is, the second current may have the minimum current value 420 at the second time 402, the maximum current value 422 at the third time 403, and the minimum current value 420 at the fourth time 404. The difference between the fourth time and the second time may be a fraction of the full period of nutation 410 of the wobble plate, for example one third of the full period of nutation.

Taken together, steps 302, 304, and 306 may create a magnetic field in a gap between a stator having a stator axis and a wobble plate having a wobble axis. The wobble plate may be configured to nutate around the stator with the wobble axis precessing around the stator axis and a mobile point of closest approach of the wobble plate relative to the stator moving around the stator axis. The magnetic field may be created by a permanent magnet and a set of electromagnetic coils. The magnetic field may further include a magnetic response of the wobble plate and a set of magnetically susceptible pole pieces.

The magnetic field in the gap between the stator and the wobble plate may have a highest flux density at a mobile location ahead of the mobile point of closest approach in an angular direction around the stator axis. Creating such a magnetic field may include inducting current in the set of electromagnetic coils with each of the set of electromagnetic coils having a coil axis and including on e or more conductors forming a plurality of closed loops around the coil axis. Each coil axis may be oriented perpendicular to the stator axis. For example, coil axis 128 shown in FIG. 9 associated with the first electromagnetic coil 150 is oriented perpendicular to the stator axis 110.

Inducing current in the set of electromagnetic coils may create an induced radial magnetic field within a set of magnetically susceptible pole pieces that may oppose a primary radial magnetic field from the permanent magnet in some of the magnetically susceptible pole pieces. For example, the first current 170 induced in the first electromagnetic coil 150 may create an induced radial magnetic field within the adjacent magnetically susceptible pole piece 106 directed radially away from the stator axis 110. Further, as shown in FIG. 4, the primary magnetic field 220 from the permanent magnet may be directed radially toward the stator axis 206. Thus, when the first current 170 is on in the first electromagnetic coil 150, the total magnetic field within the pole piece proximate the first electromagnetic coil may be less in magnitude than when no current is present in the first electromagnetic coil. Appropriate sequencing of currents within the set of electromagnetic coils may allow for creating a region of highest magnetic flux density ahead of the mobile point of closest approach.

Creating a magnetic field as described above in steps 302, 304, and 306 may include inducing a third current, indicated by arrows 174 in FIG. 9, in the second electromagnetic coil 152 and the third electromagnetic coil 154. The third current 174 may have the minimum current value, see 420 in FIG. 10, at the third time 403, the maximum current value 422 at the fourth time 404, and the minimum current value at the fifth time 405.

Creating the magnetic field may include inducing a fourth current, indicated by arrows 176 in FIG. 9, in the fifth electromagnetic coil 162 and the sixth electromagnetic coil 164. The fourth current 176 may have the minimum current value 420 at the fourth time 404, the maximum current value 422 at the fifth time 405, and the minimum current value at the sixth time 406.

Creating the magnetic field may include inducing a fifth current, indicated by arrows 178 in FIG. 9, in the third electromagnetic coil 154 and the first electromagnetic coil 150. The fifth current 178 may have the minimum current value 420 at the fifth time 405, the maximum current value 422 at the sixth time 406, and the minimum current value at the seventh time 407.

Creating the magnetic field may include inducing a sixth current, indicated by arrows 180 in FIG. 9, in the sixth electromagnetic coil 164 and the fourth electromagnetic coil 160. The sixth current 180 may have the minimum current value 420 at the sixth time 406, the maximum current value 422 at the seventh time 407, and the minimum current value at the eighth time 408.

The pattern indicated in FIG. 10 may continue, for example, with the first current 170 again being induced in the first and second electromagnetic coils 150 and 152 beginning at the seventh time 407, the second current 172 being induced in the fourth and fifth electromagnetic coils 160 and 162 beginning at the eighth time 408, etc.

Each of the first, second, third, fourth, fifth, and sixth currents 170, 172, 174, 176, 178, and 180 may vary between the minimum current value 420, the maximum current value 422, and back to the minimum current value by any appropriate shape. For example, the shape of each respective current vs. time curve may be a semi-circle as indicated in FIG. 10. In another example each of the currents may vary according to one half of a sine function. In another example each of the currents may vary linearly between the minimum current value and the maximum current value.

Example 5

This section describes additional aspects and features of embodiments, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A1. A wobble plate motor, comprising:

a wobble plate made of magnetically susceptible material and having a wobble axis; and a stator including a permanent magnet and a set of electromagnetic coils, the stator having a stator axis;

wherein the wobble plate is configured to nutate around the stator with the wobble axis precessing around the stator axis;

wherein the wobble plate has a mobile point of closest approach with respect to the stator, where the mobile point of closest approach moves around the stator axis as the wobble plate nutates; and wherein the permanent magnet and the set of electromagnetic coils are configured to create a magnetic field having a flux density between the stator and the wobble plate with a highest flux density at a mobile location ahead of the mobile point of closest approach in an angular direction around the stator axis as the wobble plate nutates.

A2. The wobble plate motor of paragraph A1, wherein a maximum attractive force between the wobble plate and the stator is applied to the wobble plate at the mobile location of highest flux density.

A3. The wobble plate motor of paragraph A1, wherein each of the set of electromagnetic coils has a coil axis and includes one or more conductors forming a plurality of closed loops around the coil axis, with each coil axis oriented perpendicularly to the stator axis.

A4. The wobble plate motor of paragraph A1, wherein the stator includes a stator core disposed below the permanent magnet, a set of magnetically susceptible pole pieces distributed circumferentially around the stator core; and wherein the set of electromagnetic coils are disposed circumferentially around the stator core and between the stator core and the magnetically susceptible pole pieces.

A5. The wobble plate motor of paragraph A4, wherein the permanent magnet is configured to create a primary magnetic field directed axially toward the wobble plate and axially toward the stator core.

A6. The wobble plate motor of paragraph A4, wherein each of the set of magnetically susceptible pole pieces is configured to direct a radial magnetic field from one of the stator core or an electromagnetic coil axially toward the wobble plate.

A7. The wobble plate motor of paragraph A4, wherein the set of electromagnetic coils includes a first set of electromagnetic coils and a second set of electromagnetic coils; and wherein each of the first set of electromagnetic coils overlaps circumferentially with each of an adjacent pair of electromagnetic coils of the second set of electromagnetic coils;

A8. The wobble plate motor of paragraph A7, wherein the stator core is configured to direct a primary magnetic field from the permanent magnet through one or more of the first and second sets of electromagnetic coils and into the set of magnetically susceptible pole pieces.

A9. The wobble plate motor of paragraph A7, wherein each of the first and second sets of electromagnetic coils is oriented to produce an induced magnetic field within said electromagnetic coil that is directed radially toward or away from the stator axis.

A10. The wobble plate motor of paragraph A7, wherein the first set of electromagnetic coils includes three inner electromagnetic coils and the second set of electromagnetic coils includes three outer electromagnetic coils disposed between the inner electromagnetic coils and the set of magnetically susceptible pole pieces; and wherein each of the inner and outer electromagnetic coils spans approximately 90 degrees around the stator axis.

A11. The wobble plate motor of paragraph A10, wherein the set of magnetically susceptible pole pieces includes twelve wedge pieces; and wherein each of the inner and outer electromagnetic coils is configured to direct magnetic field radially to three of the twelve wedge pieces.

B1. A wobble plate motor, comprising:
a wobble plate made of magnetically susceptible material and having a wobble axis; and
a stator disposed below the wobble plate and having a stator axis, the stator including
a permanent magnet;
a stator core disposed below the permanent magnet;
a set of magnetically susceptible pole pieces distributed circumferentially around the stator core;
a first set of electromagnetic coils disposed circumferentially around the stator core between the stator core and the set of pole pieces; and
a second set of electromagnetic coils disposed circumferentially around the stator core between the stator core and the set of pole pieces;
wherein each of the first set of electromagnetic coils overlaps circumferentially with each of an adjacent pair of electromagnetic coils of the second set of electromagnetic coils;
wherein the wobble plate is configured to nutate around the stator with the wobble axis precessing around the stator axis;
wherein the wobble plate has a mobile point of closest approach with respect to the stator, where the mobile point of closest approach moves around the stator axis as the wobble plate nutates; and
wherein the permanent magnet and the first and second sets of electromagnetic coils are configured to create a magnetic field having a flux density between the stator and the wobble plate with a highest flux density at a mobile location ahead of the mobile point of closest approach in an angular direction around the stator axis.

B2. The wobble plate motor of paragraph B1, wherein the magnetic field between the stator and the wobble plate is substantially parallel to the stator axis.

C1. A method of magnetically driving a wobble plate motor, the method comprising:
creating a magnetic field in a gap between a stator having a stator axis and a wobble plate having a wobble axis, with the wobble plate configured to nutate around the stator with the wobble axis precessing around the stator axis and a mobile point of closest approach of the wobble plate relative to the stator moving around the stator axis;
wherein the magnetic field is created by a permanent magnet and a set of electromagnetic coils; and
wherein the magnetic field in the gap has a highest flux density at a mobile location ahead of the mobile point of closest approach in an angular direction around the stator axis.

C2. The method of paragraph C1, wherein creating a magnetic field includes inducing a first current in each of a pair of adjacent electromagnetic coils of a first set of electromagnetic coils, the first current having a minimum current value at a first time, a maximum current value at a second time, and the minimum current value at a third time, with a difference between the third time and the first time being a fraction of a full period of nutation of the wobble plate.

C3. The method of paragraph C2, wherein creating a magnetic field includes inducing a second current in each of a pair of adjacent electromagnetic coils of a second set of electromagnetic coils, the second current having the minimum current value at the second time, the maximum current value at the third time, and the minimum current value at a fourth time, with a difference between the fourth time and the second time being a fraction of a full period of nutation of the wobble plate; and wherein one of the pair of adjacent electromagnetic coils of the first set of electromagnetic coils overlaps circumferentially with one of the pair of adjacent electromagnetic coils of the second set of electromagnetic coils and the other of the pair of adjacent electromagnetic coils of the first set of electromagnetic coils overlaps circumferentially with both of the pair of adjacent electromagnetic coils of the second set of electromagnetic coils.

C4. The method of paragraph C1, wherein creating a magnetic field includes inducing current in the set of electromagnetic coils to create an induced radial magnetic field within a set of magnetically susceptible pole pieces that opposes a primary radial magnetic field from the permanent magnet in some of the magnetically susceptible pole pieces, thereby creating a region of highest magnetic flux density ahead of the mobile point of closest approach.

C5. The method of paragraph C1, wherein creating a magnetic field includes inducing current in the set of electromagnetic coils with each of the set of electromagnetic coils having a coil axis and including one or more conductors forming a plurality of closed loops around the coil axis, with each coil axis oriented perpendicular to the stator axis.

C6. The method of paragraph C3, wherein the first set of electromagnetic coils includes a first, a second and a third electromagnetic coil, and creating a magnetic field includes inducing the first current in the first and second electromagnetic coils, inducing a third current in the second and third electromagnetic coils, and inducing a fifth current in the third and first electromagnetic coils, the third current having the minimum current value at the third time, the maximum current value at the fourth time, and the minimum current value at a fifth time, the fifth current having the minimum current value at the fifth time, the maximum current value at a sixth time, and the minimum current value at a seventh time.

C7. The method of paragraph C6, wherein the second set of electromagnetic coils includes a fourth, a fifth, and a sixth electromagnetic coil, and wherein the fourth electromagnetic coil overlaps circumferentially with the first and second electromagnetic coils, the fifth electromagnetic coil overlaps circumferentially with the second and third electromagnetic coils, and the sixth electromagnetic coil overlaps circumferentially with the third and first electromagnetic coils; and wherein creating a magnetic field includes inducing the second current in the fourth and fifth electromagnetic coils, inducing a fourth current in the fifth and sixth electromagnetic coils, and inducing a sixth current in the sixth and fourth electromagnetic coils, the fourth current having the minimum current value at the fourth time, the maximum current value at the fifth time, and the minimum current value at the sixth time, the sixth current having the minimum current value at the sixth time, the maximum current value at a seventh time, and the minimum current value at an eighth time.

C8. The method of paragraph C7, wherein each of the first, second, third, fourth, fifth, and sixth currents varies from the minimum current value to the maximum current value and back to the minimum current value according to one half of a sine function.

D1. A method of magnetically driving a wobble plate motor, the method comprising:
providing a stator disposed below a wobble plate and having a stator axis, the stator including:
a permanent magnet;
a stator core disposed below the permanent magnet;
a set of magnetically susceptible pole pieces distributed circumferentially around the stator core, the pole pieces configured to carry a primary radial magnetic field from the permanent magnet;
a first set of electromagnetic coils disposed circumferentially around the stator core between the stator core and the set of pole pieces; and a second set of electromagnetic coils disposed circumferentially around the stator core between the stator core and the set of pole pieces;
inducing a first current in each of a pair of adjacent electromagnetic coils of the first set of electromagnetic coils, the first current having a minimum current value at a first time, a maximum current value at a second time, and the minimum current value at a third time, with a difference between the third time and the first time being a fraction of a full period of nutation of the wobble plate; and
inducing a second current in each of a pair of adjacent electromagnetic coils of the second set of electromagnetic coils, the second current having the minimum current value at the second time, the maximum current value at the third time, and the minimum current value at a fourth time, with a difference between the fourth time and the second time being a fraction of a full period of nutation of the wobble plate;
wherein one of the pair of adjacent electromagnetic coils of the first set of electromagnetic coils overlaps circumferentially with one of the pair of adjacent electromagnetic coils of the second set of electromagnetic coils and the other of the pair of adjacent electromagnetic coils of the first set of electromagnetic coils overlaps circumferentially with both of the pair of adjacent electromagnetic coils of the second set of electromagnetic coils.

D2. The method of paragraph D1, wherein inducing current in the first and second sets of electromagnetic coils creates an induced radial magnetic field within the set of magnetically susceptible pole pieces that opposes the primary radial magnetic field from the permanent magnet in some of the magnetically susceptible pole pieces, thereby creating a region of highest magnetic flux density ahead of the pairs of adjacent electromagnetic coils of the first and second sets of electromagnetic coils.

D3. The method of paragraph D1, wherein the permanent magnet is configured to create a primary magnetic field between the stator and the wobble plate that is substantially parallel to the stator axis and wherein inducing current in the first and second sets of electromagnetic coils creates an induced magnetic field between the stator and the wobble plate that is substantially parallel to the stator axis and which opposes the primary axial magnetic field between the stator and the wobble plate proximate a mobile point of closest approach of the wobble plate with respect to the stator.

D4. The method of paragraph D1, wherein providing a stator including a first set of electromagnetic coils and a second set of electromagnetic coils includes providing each of the electromagnetic coils with a coil axis and one or more conductors forming a plurality of closed loops around the coil axis with each coil axis oriented perpendicularly to the stator axis.

D5. The method of paragraph D1, wherein the first set of electromagnetic coils includes a first, a second and a third electromagnetic coil, and inducing a first current in each of a pair of adjacent electromagnetic coils of the first set of electromagnetic coils includes inducing the first current in the first and second electromagnetic coils, inducing a third current in the second and third electromagnetic coils, and inducing a fifth current in the third and first electromagnetic coils, the third current having the minimum current value at the third time, the maximum current value at the fourth time, and the minimum current value at a fifth time, the fifth current having the minimum current value at the fifth time, the maximum current value at a sixth time, and the minimum current value at a seventh time.

D6. The method of paragraph D5, wherein the second set of electromagnetic coils includes a fourth, a fifth, and a sixth electromagnetic coil, and wherein the fourth electromagnetic coil overlaps circumferentially with the first and second electromagnetic coils, the fifth electromagnetic coil overlaps circumferentially with the second and third electromagnetic coils, and the sixth electromagnetic coil overlaps circumferentially with the third and first electromagnetic coils; and wherein inducing a second current in each of a pair of adjacent electromagnetic coils of the second set of electromagnetic coils includes inducing the second current in the fourth and fifth electromagnetic coils, inducing a fourth current in the fifth and sixth electromagnetic coils, and inducing a sixth current in the sixth and fourth electromagnetic coils, the fourth current having the minimum current value at the fourth time, the maximum current value at the fifth time, and the minimum current value at the sixth time, the sixth current having the minimum current value at the sixth time, the maximum current value at a seventh time, and the minimum current value at an eighth time.

D7. The method of paragraph D6, wherein each of the first, second, third, fourth, fifth, and sixth currents varies from the minimum current value to the maximum current value and back to the minimum current value according to one half of a sine function.

Advantages, Features, Benefits

The different embodiments of the wobble plate motor described herein provide several advantages over known solutions for electromagnetically driving a wobble plate system. For example, the illustrative embodiments of wobble plate described herein allow for a circumferentially rotating, axial, magnetic field. Additionally, and among other benefits, illustrative embodiments of the wobble plate motor described herein allow for a magnetic field to be created as a superposition of magnetic fields created by a permanent magnet and a set of electromagnetic coils. No known system or device can perform these functions, particularly in a wobble plate drive mechanism. Thus, the illustrative embodiments described herein are particularly useful for actuating devices requiring fine control and/or high torque densities. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

I claim:

1. A wobble plate motor (10), comprising:
   a wobble plate (12) made of magnetically susceptible material and having a wobble axis (14); and
   a stator (16) including a central permanent magnet (102) and a set of electromagnetic coils (108), the stator having a stator axis (18);
   wherein the wobble plate is configured to nutate around the stator with the wobble axis precessing around the stator axis;
   wherein the wobble plate has a mobile point of closest approach (20) with respect to the stator, where the mobile point of closest approach moves around the stator axis as the wobble plate nutates;
   wherein the permanent magnet and the set of electromagnetic coils are configured to create a magnetic field having a flux density between the stator and the wobble plate with a highest flux density at a mobile location (34) ahead of the mobile point of closest approach in an angular direction around the stator axis as the wobble plate nutates;
   wherein the stator includes a stator core (104) disposed below the permanent magnet, a set of magnetically susceptible pole pieces (106) distributed circumferentially around the stator core; and
   wherein the set of electromagnetic coils are disposed circumferentially around the stator core and between the stator core and the magnetically susceptible pole pieces.

2. The wobble plate motor of claim 1, wherein a maximum attractive force (38) between the wobble plate and the stator is applied to the wobble plate at the mobile location of highest flux density.

3. The wobble plate motor of claim 1, wherein each of the set of electromagnetic coils has a coil axis (128) and includes one or more conductors forming a plurality of closed loops (130) around the coil axis, with each coil axis oriented perpendicularly to the stator axis.

4. The wobble plate motor of claim 1, wherein the permanent magnet is configured to create a primary magnetic field (220) directed axially toward the wobble plate and axially toward the stator core.

5. The wobble plate motor of claim 1, wherein each of the set of magnetically susceptible pole pieces is configured to direct a radial magnetic field from one of the stator core or an electromagnetic coil axially toward the wobble plate.

6. The wobble plate motor of claim 1, wherein the set of electromagnetic coils includes a first set of electromagnetic coils (124) and a second set of electromagnetic coils (126); and
   wherein each of the first set of electromagnetic coils overlaps circumferentially with each of an adjacent pair of electromagnetic coils of the second set of electromagnetic coils.

7. The wobble plate motor of claim 6, wherein the stator core is configured to direct a primary magnetic field (220) from the permanent magnet through one or more of the first and second sets of electromagnetic coils and into the set of magnetically susceptible pole pieces.

8. The wobble plate motor of claim 6, wherein each of the first and second sets of electromagnetic coils is oriented to produce an induced magnetic field (226) that is directed radially toward or away from the stator axis.

9. The wobble plate motor of claim 6, wherein the first set of electromagnetic coils includes three inner electromagnetic coils and the second set of electromagnetic coils includes three outer electromagnetic coils disposed between the inner electromagnetic coils and the set of magnetically susceptible pole pieces; and
  wherein each coil of the inner and outer electromagnetic coils spans approximately 90 degrees around the stator axis.

10. The wobble plate motor of claim 9, wherein the set of magnetically susceptible pole pieces includes twelve wedge pieces; and
  wherein each of the inner and outer electromagnetic coils is configured to direct magnetic field radially to three of the twelve wedge pieces.

11. A wobble plate motor (10), comprising:
  a wobble plate (12) made of magnetically susceptible material and having a wobble axis (14); and
  a stator (16) disposed below the wobble plate and having a stator axis (18), the stator including a central permanent magnet (102);
  a stator core (104) disposed below the permanent magnet;
  a set of magnetically susceptible pole pieces (106) distributed circumferentially around the stator core;
  a first set of electromagnetic coils (124) disposed circumferentially around the stator core between the stator core and the set of pole pieces; and
  a second set of electromagnetic coils (126) disposed circumferentially around the stator core between the stator core and the set of pole pieces;
  wherein each of the first set of electromagnetic coils overlaps circumferentially with each of an adjacent pair of electromagnetic coils of the second set of electromagnetic coils;
  wherein the wobble plate is configured to nutate around the stator with the wobble axis precessing around the stator axis;
  wherein the wobble plate has a mobile point of closest approach (20) with respect to the stator, where the mobile point of closest approach moves around the stator axis as the wobble plate nutates; and
  wherein the permanent magnet and the first and second sets of electromagnetic coils are configured to create a magnetic field having a flux density between the stator and the wobble plate with a highest flux density at a mobile location (34) ahead of the mobile point of closest approach in an angular direction around the stator axis.

12. The wobble plate motor of claim 11, wherein the magnetic field between the stator and the wobble plate is substantially parallel to the stator axis.

13. A method of magnetically driving a wobble plate motor 10, the method comprising:
  providing a stator (16) disposed below a wobble plate (12) and having a stator axis (18), the stator including:
  a central permanent magnet (102);
  a stator core (104) disposed below the permanent magnet;
  a set of magnetically susceptible pole pieces (106) distributed circumferentially around the stator core, the pole pieces configured to carry a primary radial magnetic field (220) from the permanent magnet;
  a first set of electromagnetic coils (124) disposed circumferentially around the stator core between the stator core and the set of pole pieces; and
  a second set of electromagnetic coils (126) disposed circumferentially around the stator core between the stator core and the set of pole pieces;
  inducing a first current (170) in each of a pair of adjacent electromagnetic coils of the first set of electromagnetic coils, the first current having a minimum current value (420) at a first time (401), a maximum current value (422) at a second time (402), and the minimum current value at a third time (403), with a difference between the third time and the first time being a fraction of a full period of nutation (410) of the wobble plate; and
  inducing a second current (172) in each of a pair of adjacent electromagnetic coils of the second set of electromagnetic coils, the second current having the minimum current value at the second time, the maximum current value at the third time, and the minimum current value at a fourth time (404), with a difference between the fourth time and the second time being a fraction of the full period of nutation of the wobble plate;
  wherein one of the pair of adjacent electromagnetic coils of the first set of electromagnetic coils overlaps circumferentially with one of the pair of adjacent electromagnetic coils of the second set of electromagnetic coils and the other of the pair of adjacent electromagnetic coils of the first set of electromagnetic coils overlaps circumferentially with both of the pair of adjacent electromagnetic coils of the second set of electromagnetic coils.

14. The method of claim 13, wherein inducing current in the first and second sets of electromagnetic coils creates an induced radial magnetic field (226) within the set of magnetically susceptible pole pieces that opposes the primary radial magnetic field from the permanent magnet in some of the magnetically susceptible pole pieces, thereby creating a region of highest magnetic flux density ahead of the pairs of adjacent electromagnetic coils of the first and second sets of electromagnetic coils.

15. The method of claim 13, wherein the permanent magnet is configured to create a primary magnetic field (220) between the stator and the wobble plate that is substantially parallel to the stator axis and wherein inducing current in the first and second sets of electromagnetic coils creates an induced magnetic field (226) between the stator and the wobble plate that is substantially parallel to the stator axis and which opposes the primary axial magnetic field between the stator and the wobble plate proximate a mobile point of closest approach (20) of the wobble plate with respect to the stator.

16. The method of claim 13, wherein providing a stator including a first set of electromagnetic coils and a second set of electromagnetic coils includes providing each of the electromagnetic coils with a coil axis (128) and one or more conductors forming a plurality of closed loops (130) around the coil axis with each coil axis oriented perpendicularly to the stator axis.

17. The method of claim 13, wherein inducing current in the first and second sets of electromagnetic coils produces an induced magnetic field (226) that is directed radially toward or away from the stator axis.

18. The method of claim 13, wherein the permanent magnet is configured to create a primary magnetic field (220) directed axially toward the wobble plate and axially toward the stator core.

19. The method of claim 13, wherein each of the first set of electromagnetic coils overlaps circumferentially with each of an adjacent pair of electromagnetic coils of the second set of electromagnetic coils.

20. The method of claim 13, wherein each coil of the first and second sets of electromagnetic coils spans approximately 90 degrees around the stator axis.

\* \* \* \* \*